United States Patent
Harvill et al.

(10) Patent No.: US 12,518,068 B2
(45) Date of Patent: Jan. 6, 2026

(54) CONTAINERS FOR STORING AND TRANSMITTING REPRESENTATIONS OF CUSTOMIZABLE PRODUCTS

(71) Applicant: Zazzle Inc., Menlo Park, CA (US)

(72) Inventors: Leslie Young Harvill, Menlo Park, CA (US); Scott Burgess, Portland, OR (US); Brent Burgess, Winchester (GB); Matthew Difonzo, Belmont, CA (US)

(73) Assignee: Zazzle Inc., Menlo Park, CA (US)

( * ) Notice: Subject to any disclaimer, the term of this patent is extended or adjusted under 35 U.S.C. 154(b) by 0 days.

(21) Appl. No.: 18/738,921

(22) Filed: Jun. 10, 2024

(65) Prior Publication Data

US 2025/0378221 A1   Dec. 11, 2025

(51) Int. Cl.
*G06F 30/17* (2020.01)
*G06F 16/22* (2019.01)

(52) U.S. Cl.
CPC .......... *G06F 30/17* (2020.01); *G06F 16/2291* (2019.01)

(58) Field of Classification Search
CPC .............................. G06F 30/17; G06F 16/2291
USPC ...................................................... 700/103
See application file for complete search history.

(56) References Cited

U.S. PATENT DOCUMENTS

| | | | |
|---|---|---|---|
| 6,275,600 B1 | 8/2001 | Banker et al. | |
| 7,464,082 B2 | 12/2008 | Weiss | |
| 8,065,383 B2 | 11/2011 | Carlson et al. | |
| 8,958,663 B1 | 2/2015 | Harvill et al. | |
| 9,332,137 B2 | 5/2016 | Gowen et al. | |
| 9,773,263 B2 | 9/2017 | Reasoner | |
| 10,254,941 B2 | 4/2019 | Bowen | |
| 10,346,892 B1 | 7/2019 | Bagchi | |
| 10,706,637 B2 | 7/2020 | Bowen | |
| 10,719,862 B2 | 7/2020 | Harvill et al. | |
| 10,901,750 B1 | 1/2021 | Price et al. | |
| 11,017,448 B2 | 5/2021 | Evans | |
| 11,257,297 B1 | 2/2022 | Go | |
| 11,790,424 B2 | 10/2023 | McLaughlin | |

(Continued)

OTHER PUBLICATIONS

International Search Report dated Apr. 29, 2025 for Application No. PCT/US2025/019021.

(Continued)

*Primary Examiner* — Michael J Brown
(74) *Attorney, Agent, or Firm* — Patterson + Sheridan, LLP; Malgorzata A. Kulczycka

(57) ABSTRACT

A computer-implemented method, for generating and using functional data containers (ZIGs) for designing, visualizing, and manufacturing a customizable product is disclosed. In some embodiments, the method comprises: initiating an application for generating functional data containers (ZIGs) and causing reading a list of resources that includes ZIGs and images; generating, using product definition information from each of the sets of product+manufacturing instructions, a proxy representation, of proxies, of each set that defines a transformation translation mechanism; combining the proxies and images into a file and saving the file; in response to determining that the file is used by another software application, opening the file in the another software application to allow editing the proxies, and saving the file with the set of product+manufacturing instructions once editing the proxies is complete.

11 Claims, 9 Drawing Sheets

(56) References Cited

U.S. PATENT DOCUMENTS

| | | |
|---|---|---|
| 12,406,290 B2 | 9/2025 | Papale et al. |
| 2006/0117061 A1 | 6/2006 | Weiss |
| 2007/0027781 A1 | 2/2007 | Seal et al. |
| 2007/0145126 A1 | 6/2007 | Erlank et al. |
| 2008/0053167 A1 | 3/2008 | Basche |
| 2008/0091551 A1 | 4/2008 | Olheiser et al. |
| 2009/0271295 A1 | 10/2009 | Hodge |
| 2010/0185309 A1 | 7/2010 | Ohiaeri et al. |
| 2010/0217716 A1 | 8/2010 | Pieper et al. |
| 2011/0199204 A1 | 8/2011 | Dionis et al. |
| 2012/0221428 A1 | 8/2012 | Harvill et al. |
| 2012/0316668 A1* | 12/2012 | Knawa .................. G06Q 10/00 700/103 |
| 2013/0060801 A1 | 3/2013 | Beaver, III et al. |
| 2014/0114793 A1 | 4/2014 | Silver |
| 2014/0279180 A1 | 9/2014 | Beaver et al. |
| 2015/0052024 A1 | 2/2015 | Apsley et al. |
| 2015/0070523 A1 | 3/2015 | Chao |
| 2015/0145680 A1 | 5/2015 | Favier |
| 2016/0098783 A1 | 4/2016 | Margalit |
| 2016/0274867 A1 | 9/2016 | Narayanan et al. |
| 2016/0274889 A1 | 9/2016 | Kaminski et al. |
| 2016/0335690 A1 | 11/2016 | Beaver et al. |
| 2016/0343058 A1 | 11/2016 | Levy et al. |
| 2017/0046862 A1 | 2/2017 | Harvill |
| 2017/0262920 A1 | 9/2017 | Hodge |
| 2018/0012275 A1 | 1/2018 | Bloxberg et al. |
| 2018/0121842 A1 | 5/2018 | Castle et al. |
| 2018/0144392 A1 | 5/2018 | Johnson et al. |
| 2018/0174110 A1 | 6/2018 | Cvetkovic et al. |
| 2019/0012632 A1 | 1/2019 | Favier |
| 2019/0236533 A1 | 8/2019 | Gharabally et al. |
| 2019/0251613 A1 | 8/2019 | Yankovich et al. |
| 2019/0391731 A1 | 12/2019 | Adler et al. |
| 2020/0372559 A1 | 11/2020 | Bl et al. |
| 2021/0118031 A1 | 4/2021 | Beaver, III et al. |
| 2022/0122144 A1 | 4/2022 | Papale, III et al. |
| 2022/0318875 A1 | 10/2022 | Ciulis et al. |
| 2023/0065019 A1 | 3/2023 | Cook et al. |
| 2023/0384922 A1 | 11/2023 | Harvill et al. |
| 2023/0385465 A1 | 11/2023 | Harvill et al. |
| 2023/0385466 A1 | 11/2023 | Harvill et al. |
| 2023/0385467 A1 | 11/2023 | Harvill et al. |
| 2023/0386108 A1* | 11/2023 | Harvill .................. G06T 11/60 |
| 2023/0386196 A1 | 11/2023 | Harvill et al. |
| 2023/0401346 A1 | 12/2023 | Presley et al. |
| 2024/0020430 A1 | 1/2024 | Harvill et al. |
| 2024/0046328 A1 | 2/2024 | Isaacson et al. |
| 2024/0127324 A1 | 4/2024 | Tumuluri |

OTHER PUBLICATIONS

International Search Report dated May 19, 2025 for Application No. PCT/US2025/019018.
International Search Report dated May 27, 2025 for Application No. PCT/US2025/018991.
International Search Report dated May 27, 2025 for Application No. PCT/US2025/018997.
International Search Report dated May 21, 2025 for Application No. PCT/US2025/019009.
International Search Report dated May 14, 2025 for Application No. PCT/US2025/019014.
International Search Report dated May 27, 2025 for Application No. PCT/US2025/019010.
Notice of Allowance dtd Sep. 15, 2025 for U.S. Appl. No. 18/738,994.
Chu et al. (IBM Filenet P8 Platform and Architecture, 2011, pp. 1-383) (Year: 2011).
Fabian et al. (Integrating the Microsoft Kinect With Simulink: Real-Time Object Tracking Example, IEEE 2014, pp. 249-257) (Year: 2014).
Notice of Allowance dtd Oct. 30, 2025 for U.S. Appl. No. 18/738,807.
Castiglione, Arcangelo, Alfredo De Santis, and Barbara Masucci. "Hierarchical and shared key assignment." 2014 17th International Conference on Network-Based Information Systems. IEEE, 2014. (Year: 2014).

\* cited by examiner

CONTAINERS FOR STORING AND TRANSMITTING REPRESENTATIONS OF CUSTOMIZABLE PRODUCTS

FIELD OF DISCLOSURE

One technical field of the present disclosure is designing, generating, implementing, and using unique containers for creating and customizing products. Another technical field is computer-implemented techniques for defining, capturing, assembling, and displaying customized content using unique containers. Another technical field uses unique containers to generate manufacturing instructions for customized products.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

The growth of digital computation capabilities and enhancements in manufacturing processes encourages the manufacture of goods, especially those that can be customized online. These days, many manufacturers fulfill online orders received from customers who use their computer systems to customize, for example, depictions of generic goods.

Some systems on the market allow users to order products with customized attributes. For example, for photos, digital images, artwork, and other frameable products, the systems may offer the users the opportunity to customize the sizes, colors, and the like.

However, customizing the products that have many customizable parameters may be quite challenging. The selection of the customization parameters may affect the appearance and the rendering of the final custom products. Furthermore, capturing the customization parameters may involve encapsulating and transmitting the values of the customization parameters.

Data encapsulation and transmission are aspects of various technological applications, particularly those involving customizing and producing customized items. Efficient data encapsulation is necessary to manage complex data structures and to interface with diverse data sources. The efficiency often becomes critical for real-time configurations and execution. Current data encapsulation methods may not adequately cater to the specific needs associated with serialized object management, event when utilizing, for example, object-oriented programming environments.

In addition, the customization of products requires a data-handling interface that is adaptable and robust, capable of managing associative arrays and resources. The challenge resides in devising a data encapsulation method that can effectively mediate between external inputs and internal data constructs, thereby defining distinctive product characteristics for visualization and production processes. Present methodologies may fall short in providing adaptability and performance, especially when confronted with intricate hierarchies and the requirement to identify product options and limitations. An improved data encapsulation method would greatly benefit physical and/or digital and digital products' customization and production processes.

Figure 1:
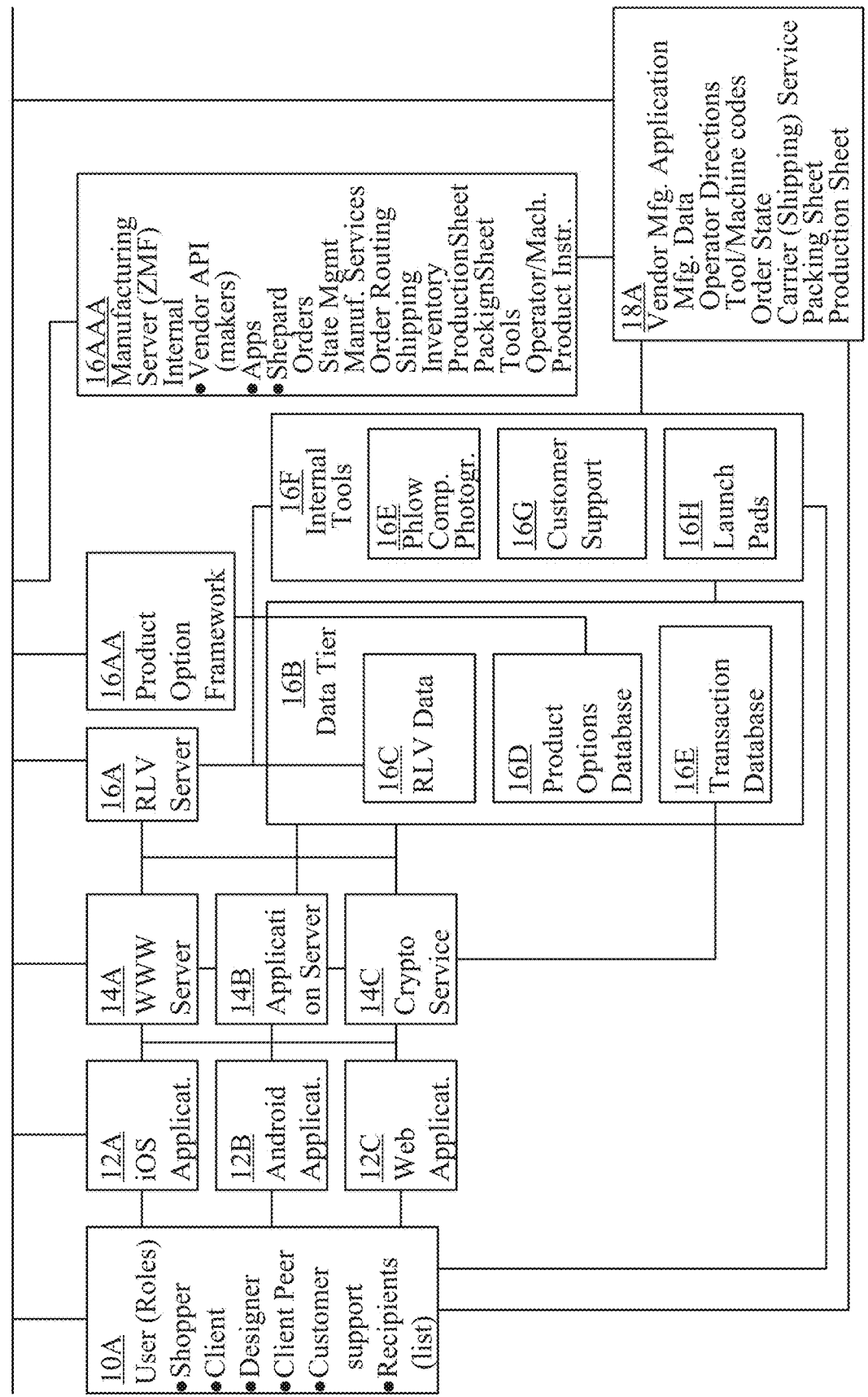
FIG. 1 is a block diagram showing an example computer environment.

All the drawings, descriptions and claims in this disclosure are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. GENERAL OVERVIEW
   1.1. TECHNICAL PROBLEM-TECHNICAL SOLUTION
   1.2. TECHNICAL EFFECTS
   1.3. APPROACH SUMMARY
2.0. UNIQUE CONTAINERS
   2.1. CONTAINER FORMAT
   2.2. EXAMPLES OF CONTAINERS
   2.3. TECHNICAL EFFECTS
3.0. ORGANIZATION OF FUNCTIONAL DATA CONTAINERS
4.0. EXAMPLES OF ROOT FUNCTIONAL DATA CONTAINER OBJECT
   4.1. KEY/VALUES
   4.2. MULTIPLE FUNCTIONAL DATA CONTAINERS
5.0. RENDERING AND MANUFACTURING
6.0. RESOURCES
7.0. OBJECT SERIALIZATION
   7.1. DEFINITIONS
   7.2. TECHNICAL EFFECTS 8.0. PRODUCT OPTIONS, BINDINGS, AND KEY/VALUES
9.0. INPUTS AND CONSTRAINTS
   9.1. EXAMPLES
   9.2. FIRST EXAMPLE FLOW CHART
   9.3. SECOND EXAMPLE FLOW CHART
10.0. DISCOVERABILITY
   10.1. INFERRING OPTIONS AND CUSTOMIZATION FEATURES
   10.2. EXAMPLE FLOW CHART
11.0. DESIGNING AND MANUFACTURING CUSTOMIZABLE PHYSICAL OR DIGITAL PRODUCTS USING CONTAINERS
12.0. EXAMPLE COLLECTION SYSTEMS
13.0. COLLECTIONS
   13.1. OVERVIEW
   13.2. FIRST EXAMPLE FLOW CHART
   13.3. SECOND EXAMPLE FLOW CHART
14.0. EXAMPLE COMPUTER ENVIRONMENT
   14.1. USER DEVICES
   14.2. CLIENT APPLICATIONS
   14.3. FRONT AND END SERVERS
   14.4. CORE SERVICES
15.0. EXAMPLE MANUFACTURING SYSTEM
16.0. EXAMPLE PRODUCT COLLABORATION PLATFORM
17.0. EMBEDDING AND REFERENCING ZIG FILES
   17.1. TECHNICAL PROBLEM-TECHNICAL SOLUTION
   17.2. TECHNICAL EFFECTS
   17.3. EMBEDDING SUMMARY
18.0. ANIMATION
   18.1. FLIPBOOKS
   18.2. ARBITRARY ANIMATION
   18.3. REAL-TIME ANIMATIONS
19.0. CLIENT IMPLEMENTATIONS
   19.1. TECHNICAL PROBLEM-TECHNICAL SOLUTION
   19.2. TECHNICAL EFFECTS
   19.3. EXAMPLE EMBODIMENTS
   19.4. CLIENT IMPLEMENTATION SUMMARY
20.0. IMPLEMENTATIONS MECHANISMS

1.0. General Overview

1.1. Technical Problem-Technical Solution

Customization of products for visualization and manufacturing presents a complex challenge in digital graphics and product design. Traditional file formats that store and transmit product representations often lack the flexibility and efficiency required for handling the intricate details of customizable products. These formats may not support the serialization of complex object hierarchies or the dynamic binding of attributes necessary for accurate product visualization and manufacturing output. Furthermore, existing solutions may not adequately address the need for real-time configuration changes based on external data sources, such as databases, which can significantly hinder the adaptability and scalability of product customization systems. The products may include physical products and/or digital products. For example, in some implementations, the approach pertains to either physical or digital products. However, is some other implementations, the approach pertains to both physical and digital products.

Current solutions for product representation often involve static file formats that do not support the serialization of proprietary objects or the dynamic interaction with external data sources. These limitations may result in a lack of real-time configurability and an inability to manage data for graphic rendering and manufacturing output efficiently. Additionally, the rigidity of such file formats can lead to increased complexity and reduced accuracy when attempting to represent customizable attributes of physical and digital products. The absence of a flexible and efficient method for storing and transmitting customizable product representations poses significant drawbacks in digital product customization and visualization.

The disclosed system introduces a novel container file format, called a functional data container (also called a ZIG container). A ZIG container is designed to store and transmit representations of customizable physical and digital products for visualization and manufacturing purposes. In some implementations, the ZIG file format encapsulates serialized proprietary digital objects, containing both data and functions, that, upon deserialization, perform functions related to data management, graphic rendering, and manufacturing output. This innovative approach allows for dynamic interactions with data sources, such as databases, to provide real-time configuration of product attributes. The ZIG file format also supports including additional data, such as digital images and geometry, alongside the serialized objects' data, thereby enhancing the richness and detail of product representations.

Throughout the disclosure, the term "composite image file" means a file that is executed by the authoring tools (described later) to generate an XML data container (i.e., a functional data container file, described in detail later), which the core services (such as core services 16 described in FIG. 1) use to generate a graphical representation of a configurable image.

Furthermore, throughout the disclosure, the term "configurable image" (e.g., a RealView described later) means an image returned by the core services in response to the user's modulated product options (based on the key/value pairs, described in detail later). The configurable image may be selected from the options displayed on a website or other service where a user may interact with digital files implementing the approach described herein.

Moreover, throughout the disclosure, the term "composite image" is a collection of layers, channels, and data elements (described in detail later) that collectively represent an interactive asset (described in detail later).

1.2. Technical Effects

The ZIG file format enables the serialization of proprietary digital objects, containing both data and functions, which, when deserialized, can perform various functions, including data management, graphic rendering, and output manufacturing. The serialization allows for the efficient storage and transmission of complex data structures representing customizable physical and digital products, facilitating their visualization and manufacturing processes.

The file format supports a logical and structured representation of product data by organizing the ZIG objects into a hierarchical tree with a single top-level root object and multiple child object data. This hierarchical organization allows for the encapsulation of data within objects, which can be instantiated and executed across different systems or servers, ensuring consistency and reproducibility of results.

Including key/value bindings and resources within the top-level root object of the ZIG file format provides a flexible interface for integrating external inputs. This capability allows for the dynamic customization of product attributes, essential for creating unique visualizations and manufacturing specifications for customizable products.

Figure 3:
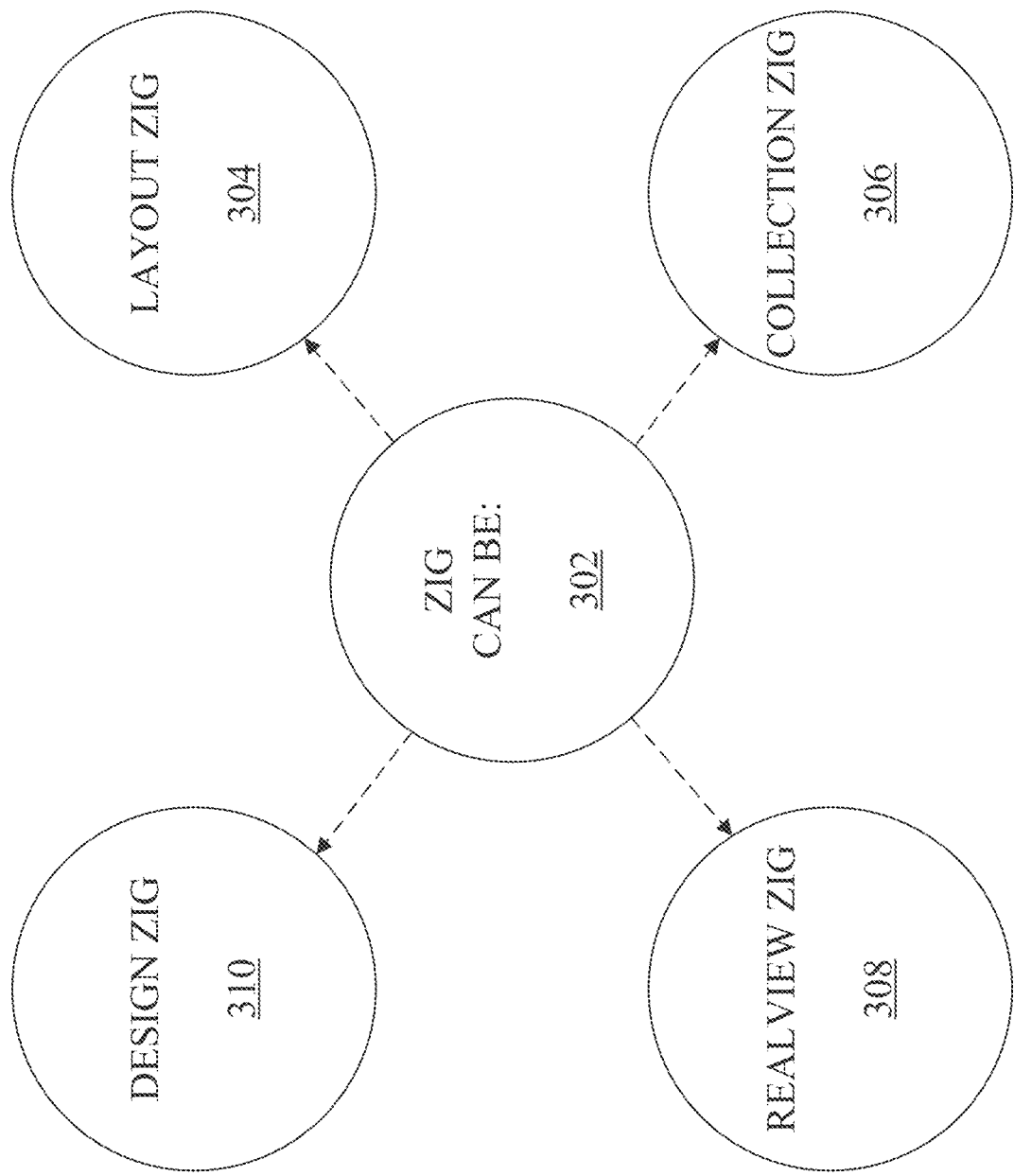
FIG. 3 depicts examples of functional data containers.

FIG. 3 depicts examples of functional data containers. The examples illustrate some of the various implementations of a functional data container file 302, i.e., ZIG files. The examples include a layout ZIG file 304, a collection ZIG file 306, RealView ZIG 308, and a Design ZIG file 310. The terms are described later. Other examples may also be implemented.

1.3. Approach Summary

The ZIG containers described herein may be used to transmit (serialize and de-serialize) customizable product information between services residing on servers within the cloud, or between a cloud service and a client, or on a client side.

One of the advantages of the container structure is that after a product representation is transmitted to the client, subsequent changes to the product description as key-value pairs may transmit only the changed data. The changed data may simply include the parameters (e.g., color, position, view, and the like) or decoration (e.g., image(s) or vector art) or geometry (e.g., 3d vector data). In each case, only what is changed needs to be transmitted.

The disclosed approach relates to a computer-implemented method and apparatus for managing physical and digital products' customization, visualization, and manufacturing using containers. The process involves receiving a ZIG file containing serialized proprietary digital objects and deserializing them to instantiate a hierarchical object structure. The deserialized objects interact with a database to obtain real-time configuration data for the physical and digital products. Key/value pairs are bound to the hierarchical structure to define the products' custom attributes. The method further includes visualizing the customized physical and digital product based on the bound key/value pairs, determining manufacturing instructions using the key/value pairs and constraints, and outputting the manufacturing instructions for producing the customized physical and digital product.

The apparatus for managing the customization, visualization, and manufacturing of physical and digital products includes memory storing instructions and a processor configured to execute the instructions. The processor performs various steps, including deserializing a container file format, containing serialized proprietary digital objects, interacting with a database to retrieve real-time configuration data, and organizing the deserialized objects into a hierarchical tree structure. The steps also include negotiating product customizations through key/value bindings, embedding resources for default visualization and customization options, utilizing a reflection model for serialization and deserialization, and selecting between binary and XML formats. Moreover, the steps include binding key/value pairs to specify unique products, incorporating manufacturing constraints and inputs, discovering customization options, and executing the deserialized object code to manage data, render graphics, and output manufacturing data.

Additional dependent claims refine the invention by specifying features such as a JSON-based serialization method. The dependent claims further specify enforcing constraints on numeric range values, limiting the depth of the hierarchical tree structure, including metadata for user interface construction, handling conflicts between external inputs and embedded resource data, maintaining backward compatibility through version control, serializing to binary or XML formats, and implementing a secure transmission protocol for data integrity.

Generally, the disclosed method and apparatus provide an efficient and flexible solution for managing physical or digital product customization, visualization, and manufacturing, enabling real-time configuration and accurate production based on custom attributes and constraints.

The present approach also relates to digital file formats and data serialization, mainly for representing customizable physical and digital products in a container file format for visualization and manufacturing processes.

2.0. Unique Containers

2.1. Container Format

A functional data container (also referred to herein as a ZIG container) is a container for storing data in a particular file format. It is used to store and transmit representations of customizable physical and digital products used for visualization and manufacturing the customized products. A functional data container may be viewed as a functional data container file or referred to as a functional data container file. The file format used to store data in the functional data container is also referred to as a digital container format.

Functional data container files in some implementations contain serialized proprietary C++ (programming language) objects. When deserialized, the C++ object code performs the functions of data management, graphic rendering, and manufacturing output. Essential to these operations are interactions with data sources such as databases, which provide real-time configuration. Additional data, such as digital images and geometry, can be stored along with the object's data.

A ZIG container can be configured to receive input from a user interface and return a digital representation of a product with specific design/manufacturing instructions. It can also be configured to return an image of the environment and product that differs from the previously defined/generated digital representation of the product/manufacturing instructions defined by key/value pairs. Various forms of manufacturing instructions are described in, for example, U.S. Pat. No. 8,958,633, and US Published Patent Application No. US 2023-0125873 A1.

Different types of ZIG containers may include a whole product manufacturing instructions file (Layout zig), a product area manufacturing instructions file (Design ZIG), a product image data and manufacturing instructions file (RealView ZIG), and the like.

A ZIG file can contain the following information: product image data, environment image data, product area information (instance segmentation, scale, transformation, placement), and environment area definition (instance segmentation, scale). The ZIG file may also contain manufacturing area definition (placement, transformation, size, scale), manufacturing instructions (product options, print layers, multiple areas), key-value data (user input to configure a digital representation of the product, text, numbers, images, various area mappings and definitions), and the like.

A ZIG file can be created as a discrete set of product definitions/manufacturing instructions stored in a database and encoded into a UI. The source of the data may be obtained from, for example, a manufacturer. This information set may be used to generate user input options for the ZIG file based on the manufacturing constraints defined by the product's manufacturer. The UI may be viewed on a web browser page. The web page sends the configuration data for the output from the ZIG via a URL address request using the key/value pairs.

2.2. Examples of Containers

In some embodiments, a functional data container file format is used. The container is designed to encapsulate high-resolution digital images for product customization, where the images are stored in a lossless compression format to preserve quality for high-end printing applications. The ZIG file format is adaptable to various product types, such as apparel, posters, and home decor items, requiring different image resolutions and color profiles. The hierarchical tree structure within the ZIG file allows for efficient organization of these images, with the root object containing metadata about the product type and child objects storing individual images and their associated customization parameters.

Another embodiment of the ZIG file format may focus on three-dimensional (3D) geometry data for products that require structural visualization, such as custom jewelry or furniture. In this case, the ZIG file may contain serialized C++ objects that, when deserialized, can render 3D models with textures and materials. The hierarchical tree structure is utilized to manage the relationship between different components of the 3D model, such as individual parts of a piece of furniture, allowing for independent manipulation and customization of each part within the ZIG file.

A further embodiment could be tailored for the manufacturing output of customizable products, where the ZIG file format includes serialized C++ objects that contain machine-readable instructions for manufacturing equipment. The hierarchical tree structure organizes these instructions by manufacturing stage or component, enabling a streamlined production process. This embodiment would be particularly useful for products that require assembly from multiple parts, as the ZIG file would contain the necessary data to guide the assembly process, ensuring that each component is produced according to the correct specifications and in the proper sequence.

In some embodiments, the ZIG file format may be optimized for web-based visualization, allowing customers to interact with and customize products in real time on an e-commerce platform. The serialized C++ objects within the ZIG file may be designed to be lightweight and fast loading, ensuring a smooth user experience even on devices with limited processing power. The hierarchical tree structure in this embodiment manages the dependencies between different customization options, such as color choices or text inputs, so that changes made by the user are immediately reflected in the product's visual representation.

Each of these embodiments demonstrates the versatility of the ZIG file format in accommodating different types of product data, from images and 3D models to manufacturing instructions and interactive web elements, all while maintaining the integrity and functionality of the serialized C++ objects contained within.

2.3. Technical Effects

The term technical effects refers to the practical and tangible outcomes or results achieved by implementing a computer-implemented method for designing, visualizing, and manufacturing a customizable physical or digital product using the ZIG file format. Some of the disclosed method's technical effects include efficient storage and transmission of customizable product representations. Using the ZIG file format allows for the serialization and deserialization of proprietary digital objects containing both data and functions, enabling the storage and transmission of customizable product representations compactly and efficiently.

Other technical effects include real-time configuration and customization: The negotiation between external key/value inputs and the hierarchy of ZIG objects enables the definition of custom attributes for the physical or digital product in real time. This allows for dynamic customization and configuration of the product based on user preferences or specific requirements.

Additional technical effects include precise specification of visualization and manufacturing details. The binding of key/value pairs to geometry objects within the ZIG hierarchy allows for the accurate specification of unique visualization and manufacturing details for the physical or digital product. This ensures the product is accurately represented, manufactured and according to the desired specifications.

Further technical effects include seamless integration with manufacturing systems. The translation of key/value pairs into a set of manufacturing instructions in a compatible data format enables seamless integration with a manufacturing system's executable programs. This facilitates the efficient generation of the customizable physical or digital product based on the specified design and customization parameters.

Additional technical effects include visual comparison and discrepancy detection. The use of imaging means and graphical representation systems allows for the detection of visual differences between the manufactured physical or digital product and a synthetic rendering of the custom product. This enables the identification of any discrepancies or variations between the actual product and the intended design. Examples of various forms of the means are described in, for example, U.S. Pat. Nos. 9,823,642, 9,852,533, and 10,137,590, and US Published Patent Applications Nos. 2021-0118031-A1 and 2021-0125192-A1.

Further technical effects include improved accuracy and resemblance to the synthetic rendering. The correlation of modified key/value pairs with the original key/value pairs allows for determining discrepancies between the physical or digital product and the synthetic rendering. Based on these discrepancies, additional instructions can be generated to enable the manufacturing system to produce a new physical or digital product that more accurately resembles the synthetic rendering of the custom product.

Generally, the technical effects of the disclosed method include efficient storage and transmission, real-time configuration and customization, precise specification of visualization and manufacturing details, seamless integration with manufacturing systems, visual comparison and discrepancy detection, and improved accuracy and resemblance to the synthetic rendering of the custom product.

3.0. Organization of Functional Data Containers

In object-oriented programming, such as C++, an object class combines methods (i.e., functions) and data. The contents of a functional data container file include the data section of the object. Once written to a file, functional data container objects can be re-instantiated based on the file contents. Object methods can be executed simultaneously on one or more systems or servers, with reproducible results.

Functional data container objects refer to any C++ class in the proprietary source code. They are arranged logically into a hierarchical tree. A single object is usually the top-level root object. The root object contains a list of one or more child objects, including their child objects, and so forth. Child objects are usually data members of their parent object.

4.0. Examples of Root Functional Data Container Object

In some embodiments, a root functional data container object may be defined as a C++ class object as follows:
Object Data [0 . . . n]
Child FUNCTIONAL DATA CONTAINER Object 1
    Object Data [0 . . . n]
    Child Functional Data Container Objects [0 . . . n]
[ . . . FUNCTIONAL DATA CONTAINER Objects . . . ]
Child FUNCTIONAL DATA CONTAINER Object n
    Object Data [0 . . . n]
    Child FUNCTIONAL DATA CONTAINER Objects [0 . . . n]

4.1. Key/Values

Typically, a top-level root object contains key/value bindings and resources to negotiate between external key/value inputs and its child objects (such as polygon geometry). Key/value negotiations may be implemented in a core interface that enables custom attributes to define a unique product for visualization or manufacturing.

In some embodiments, a root functional data container object may be defined as a C++ class object as follows:
Root ZIG Object
    Key/Values [0 . . . n]
    Resources [0 . . . n]
    Object Data [0 . . . n]
    Child ZIG Object 1
        Object Data [0 . . . n]
        Child Zig Objects [0 . . . n]
    [ . . . ZIG Objects . . . ]
    Child ZIG Object n
        Object Data [0 . . . n]
        Child ZIG Objects [0 . . . n]

In the above example, each key/value pair consists of a name ("key") and data ("value"). The key is a name that is used to match inputs with object fields within the ZIG. Values can be literal data, like a string of text or an RGB color, or a reference to an external or embedded object, like image data.

A set of key/value pairs may be derived from the functional data container objects contained in the file's object hierarchy. Each functional data container object can have zero or more key/value pairs that may be created or generated during a binding process that happens when the functional data container objects are deserialized. The binding is used to create the interface where custom data is specified for visualization and manufacturing.

For example, a polygon that renders a user's custom artwork might have a key named "front" that the polygon geometry uses to visualize or manufacture the custom artwork on a product. In this case, the key name "front" may refer to a printable area as defined in the product database. When the functional data container objects are deserialized, the "front" key/value may be added to the list of keys in the root object. This means that the "front" may be used as input into requests for visualized or manufacturing output.

Keys may be encoded with properties that define the kind of data expected as the values associated with the keys. The data types may include, for example, text, a number, an array of numbers, image data, and the like. The data type may be the primary constraint, although other constraints, such as ranges of numbers, may also be used as primary constraints.

Data can be of various types, either literal (such as a numeric value) or a reference to external data, such as image data. Internally, to the functional data container C++ objects, the value may be represented as a union, where multiple kinds of data may share the same memory location.

The concept of keys and values is widely used; the most common example is as a query input in a Uniform Resource Location (URL) in the format <? key=value>, for instance, http://www.mydomain/subdirectory?page=20 where the key is "page" and the value is "20." A URL query can be a source of keys/values that define a custom product.

4.2. Multiple Functional Data Containers

Functional data container files may contain image resources, products, image references (key-value information), geometry, product area information, etc. All information contained in the functional data container file (which itself may be generated by a data-flow process) may be imported into a data-flow process and can be available to the process.

Generally, multiple functional data container files are available for a product in the product asset library. One or more functional data container files may be imported into a data-flow process and then combined into a new ZIG file. This resulting functional data container file may be a meta-file of a product or products selected from the product asset library.

For example, a single functional data container file may be used in multiple instances in a data-flow process to create a multi-part product, such as a string of flags or bunting. Functional data container files of different products may be created from the product asset library and arranged in relation to, for example, a background image. The above processes may result in creating a new functional data container file, which may contain the individual product's information specific to each product representation for each functional data container file.

Functional Data Container files may contain information on a digital version of a physical or digital product and its embellishment and manufacturing data. Being able to take a Functional Data Container file and arrange it within the context of another image (for example, a background image of a table or an arranged display) or one or more Functional Data Container files is analogous to taking a physical or digital product and placing it in a store display. However, in this example, the appearance, design, physical or digital properties, and other information of a product, or products, has been defined in the core services and is represented using a virtual representation created by the authoring tools and contained in a Functional Data Container file.

5.0. Rendering and Manufacturing

In some implementations, one or more software applications use functional data container files to generate high-quality renderings and manufacturing outputs of custom products. Generating high-quality renderings and outputs may include several visualization tasks and production tasks. The tasks may be performed by executing the software applications as a set of sequential and parallel processes.

The applications may receive, as input, an initial description of a product to be displayed and then made available for customization. From the initial description, the applications may generate layouts or manufacturing files that include a high-level representation of how the product is to be made or embellished and what customizable parts it has.

Manufacturing files may also include, for example, markups, and the files with markups may be sent to a manufacturer. A markup may be a two-color checkerboard pattern comprising a plurality of squares, where each square is of a single color, and each adjacent square is of an opposite color. For example, a markup may be a two-color checkerboard pattern comprising solid-colored squares, where each square is of a single color, and each adjacent square is of the opposite color. A markup portion of an input image may be partitioned into a set of regions, where each region of the set of regions represents a single corresponding square of the markup. The markups may include different patterns, shapes, or colors in other embodiments. The markups have been disclosed in, for example, U.S. Pat. Nos. 9,852,533 B2 and 10,283,165 B2.

After receiving the manufacturing files for a product, a manufacturer may generate a physical or digital product containing the markups and send it to the platform's operators.

Upon receiving the physical or digital product with the markups, the platform's operators may take, for example, digital cameras and a set of high-quality photographs depicting the physical or digital product and the corresponding markups. The pictures are then provided as input to the authoring tools executing on the platform. For example, the photographs containing the markups may be provided as input for generating various views of the product and depicting the product as having different finishes, patterns, colors, shadings, and the like.

In some implementations, various views are used to depict the product and to allow generating output, which then can be, for example, displayed on the website generated by the visualization platform and made available to customers for personalization, customization, and potentially purchasing.

Various depth maps and laser-based imagery may also be used. Examples of devices that capture information about a product's physical or digital appearance or construction may include cameras, scanning devices (such as laser scanners, iPhones (Time Of Flight imaging), Kinects (structured infrared light pattern), and the like. Depth maps (generated using, for example, Microsoft's Kinect hardware and laser scanners may be used as scanning devices in testing and asset production. In the context of this disclosure, they operate similarly to, for example, a camera. They may be configured to capture the product's physical or digital attributes or surface characteristics. The depth maps and laser scans may then be used in asset generation in the authoring tool.

If a customer finishes customizing a product, the data describing the customized product may be transmitted to, for example, a print server. The print server may use the data to generate a manufacturing output file. The output file may contain manufacturing instructions, which a manufacturer may use to manufacture the customized product as ordered by the customer.

6.0. Resources

In the context of functional data containers, a resource is defined as a set of data objects embedded in the functional data container file at the top level of its object hierarchy that can include images, text, color information, and other types of data. These data objects capture the default visualization and customization options for a product. External key/value data input supersedes any embedded resource data.

A typical functional data container use-case of keys/values and resources includes a background image that provides context for a customized product. For example, suppose that the customizable product is a tote bag, and the visualization includes a depiction of the tote bag in a beach scene. In this example, the key is "background," and the default value is "image," which is a reference to a resource for a digitized image of the beach scene.

Continuing with the tote bag example, during the visualization rendering of the tote, if no external "background" key is provided, then the customized tote bag is set on the beach. The requestor can provide its own "background" key, whose value may be a reference to an image external to the functional data container. In this example, the key may be an image of a high-end boutique's background that provides a new context for the customized tote bag visualization.

7.0. Object Serialization

7.1. Definitions

Serialization and de-serialization allow the expression of the objects, their data, and their relationships to other objects within a functional hierarchy of data container objects. Serialization/de-serialization may be performed to store the objects and their data in a storage device or to transmit the objects and their data as a data stream according to communications protocols, such as TCP/IP.

Functional data container objects may use a reflection model to automate serialization and de-serialization. In the serialization process, the amount of serialized data written to storage needs to be sufficient to allow recreating the C++ object(s) from the serialized data to deserialized data so that the deserialized data are identical to the objects before serialization. The reflection model may have various characteristics. For example, each functional object (i.e., a combination of data and functions that operate upon that data) in the container format can describe, as one of its functions, a list of each data element.

Furthermore, each member in the list of data elements may contain the data type of that element. The data type may be an integer of a given bit size, a floating point number of a given bit size, a Boolean value, an array of data types of fixed size, an array of data types of variable size, an object containing a set of data types, and the like.

Moreover, each member in the list of data elements may contain the size of the element.

Also, each member in the list of data elements may contain the offset of the data within the containing object.

Furthermore, each member in the list of data elements may provide a function to serialize and deserialize the element.

For each class of C++ object in a functional data container, there is a table that describes each data element (i.e., C++ class member variables). The table includes the object's name, data type, and byte size. Through this table, the data can be serialized/deserialized without executing the explicit per-object class code.

The table may also be extended to provide information about editing the object using the capabilities of a user interface. The interface may offer user-friendly details (e.g., a label, help text) and hints at automated user interface constructions (e.g., an editor, options, and constraints).

Each object may be represented by a class tag, which may enable instantiating the correct class of C++ object. Then, the object may be represented by an attribute of the object, followed by any child object.

A name may reference serialized data fields. Since each data element for each object in the file is atomic with its reflection metadata (i.e., each data element is not a contiguous binary block of data for the whole object's data), the serialized data format is very flexible. For example, it allows adding and removing data from the C++ objects without invalidating existing serialized objects. For instance, if a data field referenced as "Name" is added or removed from the C++ object, the object code's previous and future versions can still de-serialize valid objects.

Functional data container objects can be serialized/de-serialized to binary data or XML text. The binary form of the data may be a tagged container file where each object begins with a 4-byte class tag and is followed by a byte count of the data chunk for the object. Each data element may be described by its text name and is followed by the data. The reflection model in the C++ code contains information about the byte size and binary format of each data element so that it can distinguish between eight bytes of integer binary data from eight bytes of floating point binary data.

The XML serialized functional data container file may contain the same information as the binary but may follow the XML syntax and structure. The syntax of XML implies information about data types, sizes, and data ownership. Since there is no formal XML Document Object Model (DOM), the functional data container C++ object code defines the object model. Since the interpretation of text data in XML is quite efficient, the binary format of an XML file is quite efficient in both storage space and processor use.

7.2. Technical Effects

Generally, the approach for object serialization and de-serialization provides several technical effects such as efficient storage and transmission of product data, logical organization and management of the data, real-time configuration and customization capabilities, enhanced discoverability of options and customizations, and accurate visualization and manufacturing of the customizable physical and digital products.

For instance, by serializing proprietary objects into a container file format, each serialized object may represent a customizable physical or digital product (or its portion) for visualization and manufacturing. This allows for efficient storage and transmission of the product data.

Furthermore, organizing the serialized objects into a hierarchical tree structure within the container file format enables a logical and efficient representation of the relationships between the objects. The top-level root object containing a list of child objects allows easy navigation and customizable product data management.

Moreover, storing additional data, such as digital images and geometry, within the container file format ensures that all relevant information for the customizable physical and digital products is unified. That facilitates the rendering and manufacturing processes.

Also, deserializing the serialized objects in the computing system enhances the performance of data management, graphic rendering, and manufacturing output functions. That allows for the manipulation and visualization of the customizable product data.

Furthermore, interacting with a database to provide real-time configuration of the customizable physical and digital products based on the deserialized objects ensures that the products can be customized and adapted according to specific requirements or user preferences.

Moreover, inferring available options and customizations for the customizable physical and digital products from the deserialized objects enhances the discoverability of the product features and attributes. That enables users to identify and select the desired customizations easily.

Furthermore, binding key/value pairs to the deserialized objects creates an interface for specifying custom data for visualization and manufacturing. That allows users to define and input custom attributes and customization data.

In addition, correlating keys with properties that define expected data types for the values ensures that the input data are validated and conform to the specified requirements, helping to maintain data integrity and accuracy.

Moreover, accumulating the key/value pairs during the deserialization process enables the computing system to visualize and manufacture the customizable physical and digital products based on the specified custom data. That ensures that the final products accurately reflect the desired customizations.

8.0. Product Options, Bindings, and Key/Values

In some implementations, a computer system binds a set of key/value pairs to a hierarchical object structure. The key/value pairs define custom attributes of the product. The keys are attributes of geometry objects within the hierarchical structure, and the values are selected from the group consisting of literal data and references to external or embedded objects.

The literal data may include a representation of a numeric value as a string of alphanumeric values. The literal data may also include a representation of an array of numeric values as delimited strings of string of alphanumeric values. Furthermore, the literal data may include a representation of a descriptor of an attribute such as a color (e.g., "teal") that has an associated numeric attribute. Moreover, the literal data may include a representation of a descriptor of an attribute such as 'size' as "medium" that has an associated numeric attribute.

Geometry objects within a hierarchy of functional data containers are abstract objects that do not have enough information to display or manufacture products. However, the bindings of key/value pairs allow specifying the unique products. In the bindings, the keys are attributes of the geometry. Value data are bound (by a key name) using internal or external sources to the corresponding keys. Key/value pairs have assigned types, which are used to constrain, for example, the input data. The key/value types may include, for example, integers, colors, text, images, and the like.

Some values, such as default colors or product photographs, are embedded into the functional data container file itself as resources. These values may be combined with additional keys from other sources, such as a database or URL query, to visualize and manufacture a unique product. The structure and specifications of these custom product keys are derived from the functional data container objects.

For example, a t-shirt may have keys for the shirt color and artwork for the front, back, and pocket printable areas. The product options and their associated constraints (e.g., selection of colors and dimensions of artwork areas) may be ingested into the database.

In some embodiments, a user interface is created for designing unique products. The user interface may be configured to retrieve the options and constraints from the database, generate a set of options based on the retrieved options and constraints, and present the set of options to an end-user. The corresponding keys and values may be given to the functional data container objects to visualize and manufacture the product.

Sometimes, the keys needed to visualize a product may not be required to manufacture it. For example, a key containing a red color ramp is needed to visualize a red shirt. However, for manufacturing, the shirt is already red, and instead of a key specifying a color ramp, an equivalent key (such as a red t-shirt SKU number) may be provided to the manufacturing process.

9.0. Inputs and Constraints

Manufacturing constraints provide the information needed to configure and structure functional data container documents. The constraint inputs may include the geometry and measurements of physical or digital areas for embellishments (e.g., printing, embroidery, and the like), color options for the entire product or certain elements (e.g., piping), and options such as fabric, paper type, and other materials. Furthermore, the manufacturing constraints for data such as barcodes and order numbers may also be provided. Although not presented during visualization or in the final manufactured product, the data is usually vital for logistics and order tracking.

9.1. Examples

Constraint input data can be manufacturing files (e.g., CAD or PDF data for embellishment areas), lists, swatches, materials, or product samples. The manufacturing data may provide a specification and template for the customized product, both in terms of manufacturing the product and visualizing it. Input data can be used directly to create functional data container objects (e.g., CAD or PDF data), which can be photographed or measured with a tool such as a colorimeter. A given constraint can either define a functional data container object or specify an attribute of an object.

In some embodiments, the constraints are used to make decisions regarding the best presentation of the product and the product's customizations. The decisions may include determining whether to show the whole product or portions of the product. The decisions may also involve determining the context (on a model, in a room, or on a table) where the product will be presented. Given these choices, a hierarchy of functional data container objects that visualizes a custom product can be created using input data, photography, database entries, and generative AI.

The constraints may be based on key/values—the route through which user product customization is specified in the system for visualization and manufacturing. The constraint's name (e.g., "front," "shirt color," "papertexture") may be used as a key, and the available options may be used as possible values of the key. Value options can be limited (e.g., to "black" or "white" as two product color choices), or they can be infinite when the value is digital artwork or text.

For example, if a paper card product features printable areas on both sides, the input manufacturing files could contain two rectangular areas: "front" and "back." The two regions could be in the same shape and size as the printable areas of the card. The key/values that bind the user artwork to the visualization may be called "front" and "back." A tool to design artwork could allow the user to create two pieces of artwork, one for each side. The two areas influence the decision to select combinations of visualizations for the user. For example, the decision may be made to show both sides at once or one side at a time. When the user orders their product, "front" and "back" are the input keys/values into the functional data container objects that generate printable artwork files.

9.2. First Example Flow Chart

Figure 4:
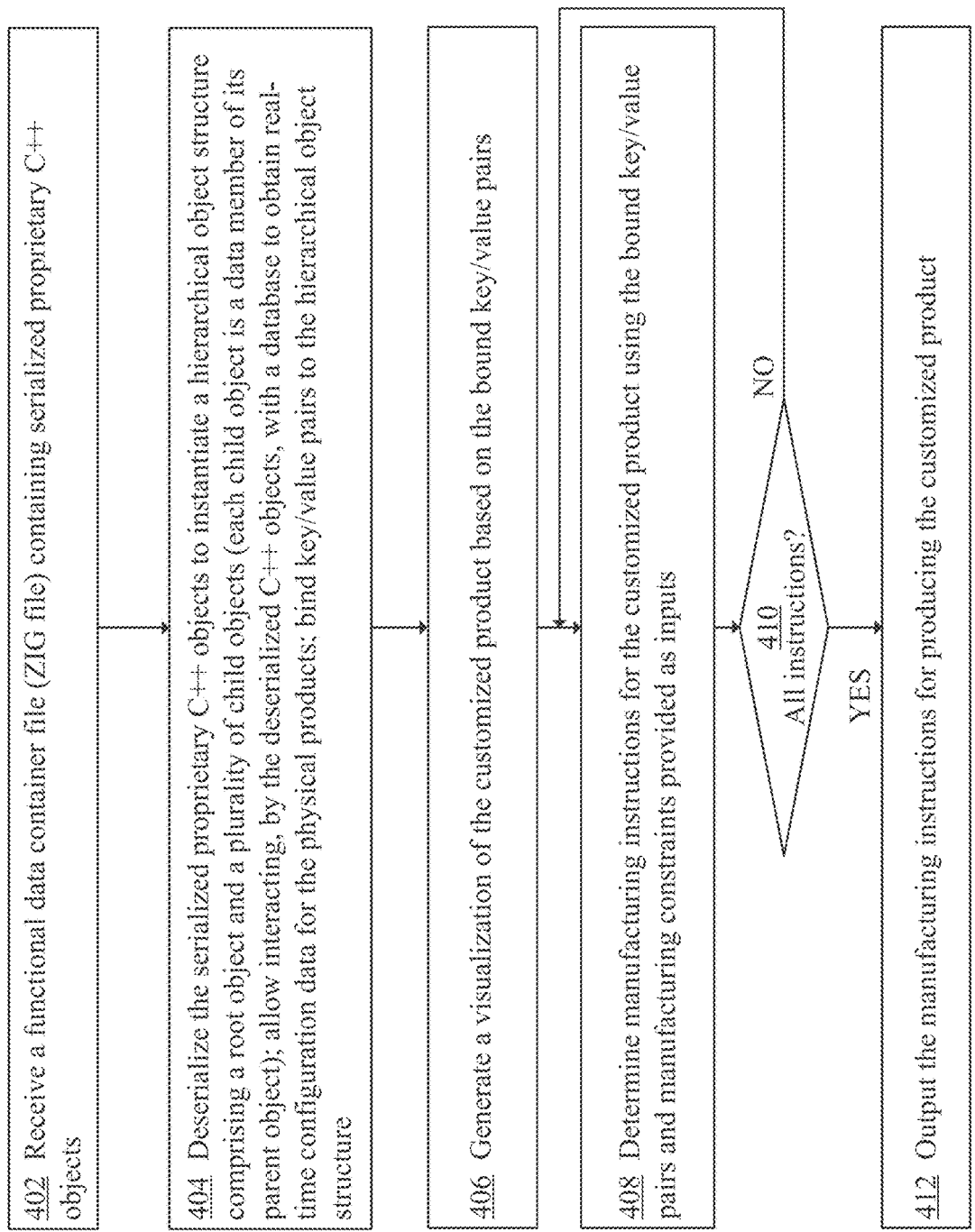
FIG. 4 is a flow chart depicting an example process for customization, visualization and manufacturing of products using functional data containers.

FIG. 4 is a flow chart depicting an example process for managing physical and digital products' customization using functional data containers. The products may include physical products and/or digital products. For example, in some implementations, the approach pertains to either physical or digital products. However, in some other implementations, the approach pertains to both physical and digital products.

In step 402, a computer system receives a functional data container file (ZIG file) containing serialized proprietary objects. The serialized proprietary objects in the ZIG file are deserialized using a reflection model that automates the serialization and deserialization of the objects. In some cases, the objects may be serialized using C++ functionalities, and deserialized using another compiled or interpreted language such as Java, Java Script, TypeScript, Python, JSON (Java Script Object Notation), or the like. Other method of serializing and deserializing objects may also be implemented.

In step 404, the computer system deserializes the serialized proprietary objects to instantiate a hierarchical object structure comprising a root object and a plurality of child objects, wherein each child object is a data member of its parent object. The hierarchical object structure of the serialized C++ objects is represented in a binary format or an XML format, and the key/value pairs are stored and referenced within the serialized objects.

Also, in this step, the computer system allows the deserialized C++ objects to interact with a database to obtain real-time configuration data for the products.

Furthermore, in step 404, the computer system binds a set of key/value pairs to the hierarchical object structure, wherein the key/value pairs define custom attributes of the products and wherein the keys are attributes of the geometry objects within the hierarchical structure. The values are selected from the group consisting of literal data and references to external or embedded objects. The binding of the key/value pairs may be based on the user input.

In step 406, the computer system generates a visualization of the customized physical or digital product based on the bound key/value pairs. The visualization includes rendering the custom artwork on a printable area of the physical or digital product based on a key/value pair specifying the location of the custom artwork.

In step 408, the computer system determines manufacturing instructions for the customized physical or digital product using the bound key/value pairs and manufacturing constraints provided as inputs. The manufacturing instructions include specifications for embellishments on the physical or digital product, such as printing or embroidery, based on key/value pairs defining the locations and dimensions of the embellishment areas.

In step 412, the computer system outputs the manufacturing instructions for producing the customized physical or digital product.

9.3. Second Example Flow Chart

Figure 5:
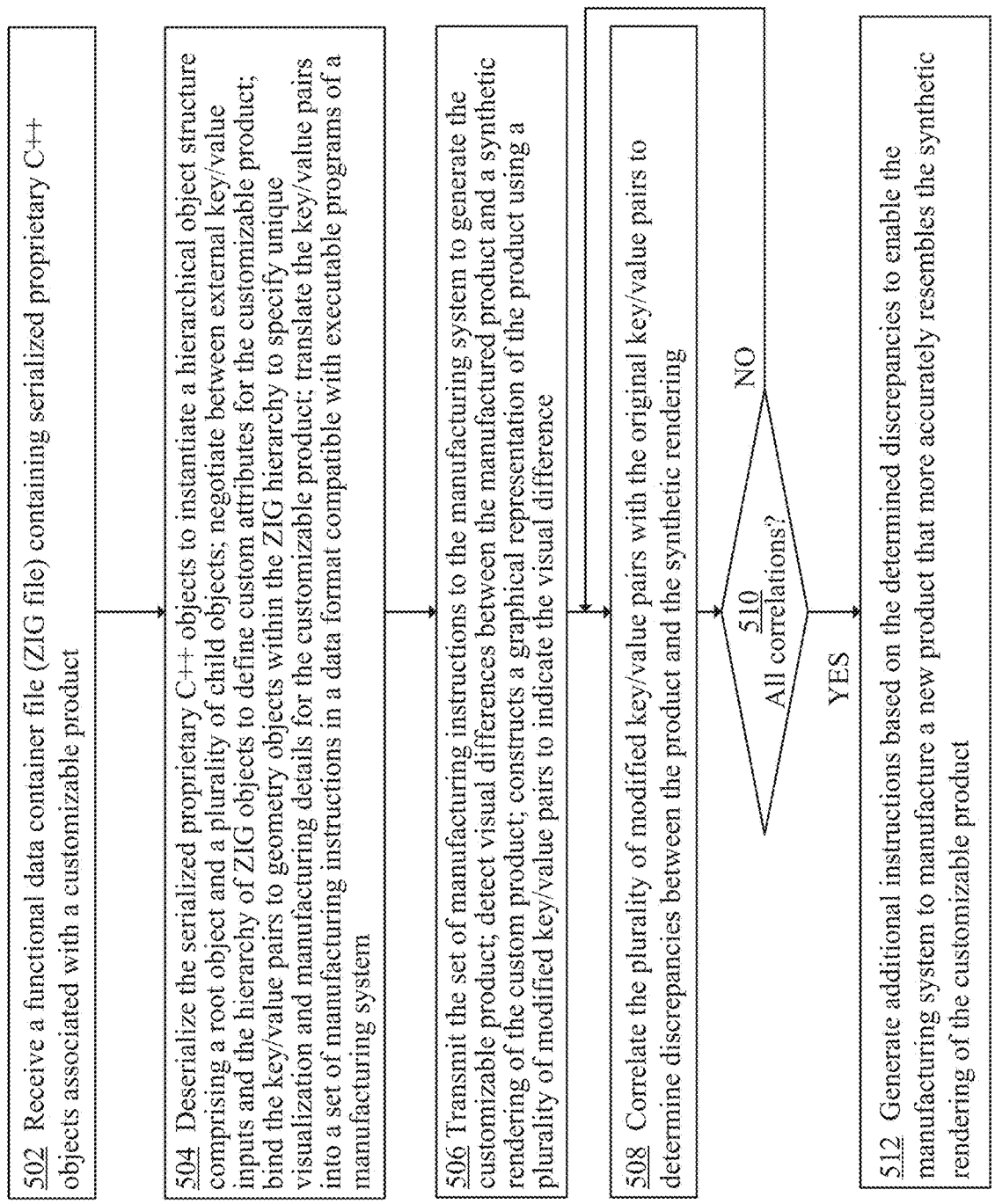
FIG. 5 is a flow chart depicting an example process for customization, visualization and manufacturing of products using functional data containers.

FIG. 5 is a flow chart depicting an example process for customization, visualization, and manufacturing of products using functional data containers.

In step 502, a computer system receives a ZIG file containing serialized proprietary objects associated with a customizable product. The ZIG file may further comprise embedded resources for default visualization and customization options for the product.

In step 504, the computer deserializes the serialized proprietary objects to instantiate a hierarchy of ZIG objects, each ZIG object comprising a data section with key/value pairs and resources for product customization. The key/value pairs are usually bound to geometry objects within the ZIG hierarchy to specify attributes for different printable areas of the product.

In addition, in this step, the computer system negotiates between external key/value inputs and the hierarchy of ZIG objects to define custom attributes for the customizable product.

Furthermore, in this step, the computer system binds the key/value pairs to geometry objects within the ZIG hierarchy to specify unique visualization and manufacturing details for the customizable product. This may include, for example, performing a full key/value binding as described in detail in Section 4.1. KEY/VALUES.

In addition, the computer system translates the key/value pairs into a set of manufacturing instructions in a data format compatible with executable programs of a manufacturing system. The manufacturing instructions include specifications for embellishments, color options, and materials for the product.

In step 506, the computer system transmits the set of manufacturing instructions to the manufacturing system to generate the customizable product.

In this step, the computer system detects visual differences between the manufactured product and a synthetic rendering of the custom product.

Furthermore, the computer system constructs a graphical representation of the product using a plurality of modified key/value pairs to indicate the visual differences. The graphical representation system may generate a side-by-side comparison of the product and the synthetic rendering to highlight the visual differences.

In step 508, the computer system correlates the plurality of modified key/value pairs with the original key/value pairs to determine discrepancies between the product and the synthetic rendering.

Suppose all correlations are completed in step 512. In that case, the computer system generates additional instructions based on the determined discrepancies to enable the manufacturing system to manufacture a new product that more accurately resembles the synthetic rendering of the customizable product. Further instructions may include adjustments to manufacturing parameters to improve the resemblance between the manufactured product and the synthetic rendering.

In some embodiments, the manufacturing system comprises one or more computer-controlled manufacturing devices.

10.0. Discoverability

10.1. Inferring Options and Customization Features

In some implementations, an object hierarchy for functional data containers is generated from manufacturing constraints. Hence, the functional data container objects may contain the information needed to visualize and manufacture custom products. A set of functional data container objects for a product (e.g., a package of one or more files on a storage device or network) can be used to determine or infer the options and customization features available for the product.

An available set of keys for an object includes attributes of the object for which customizations are available. Each key is specified by its name-determining how the data from external inputs is bound to the object. The input type of the customizable data for each key is an attribute of the key itself. The type of data to provide the value to the key can be either implicit (e.g., RGB color, text, image data, etc.) or implied (e.g., a set of stored files or network resources whose file names comply with, for example, a pattern). Additional hinting for each key provides more context for presenting a user interface or constraining the input values (e.g., numeric ranges.

Key/value availability and constraints can be extracted from a serialized functional data container file in two ways. If the file is serialized into XML format, the document can be parsed using a generic DOM, and the relevant section of the objects can be analyzed. Alternatively, objects can be deserialized using the functional data container C++ code, queried using object methods, and accessing data member variables directly.

Typically, the keys and values for the product options are stored in a database. The database can be used as a primary source to coordinate creating user interfaces for interacting with virtual custom products. It can also be used to generate manufacturing data for the products and process the logistics from manufacture to delivery. A set of constraints for the database is arrived at by a combination of information provided by the manufacturer and information discovered from the functional data container objects relevant to the product.

10.2. Example Flow Chart

Figure 6:
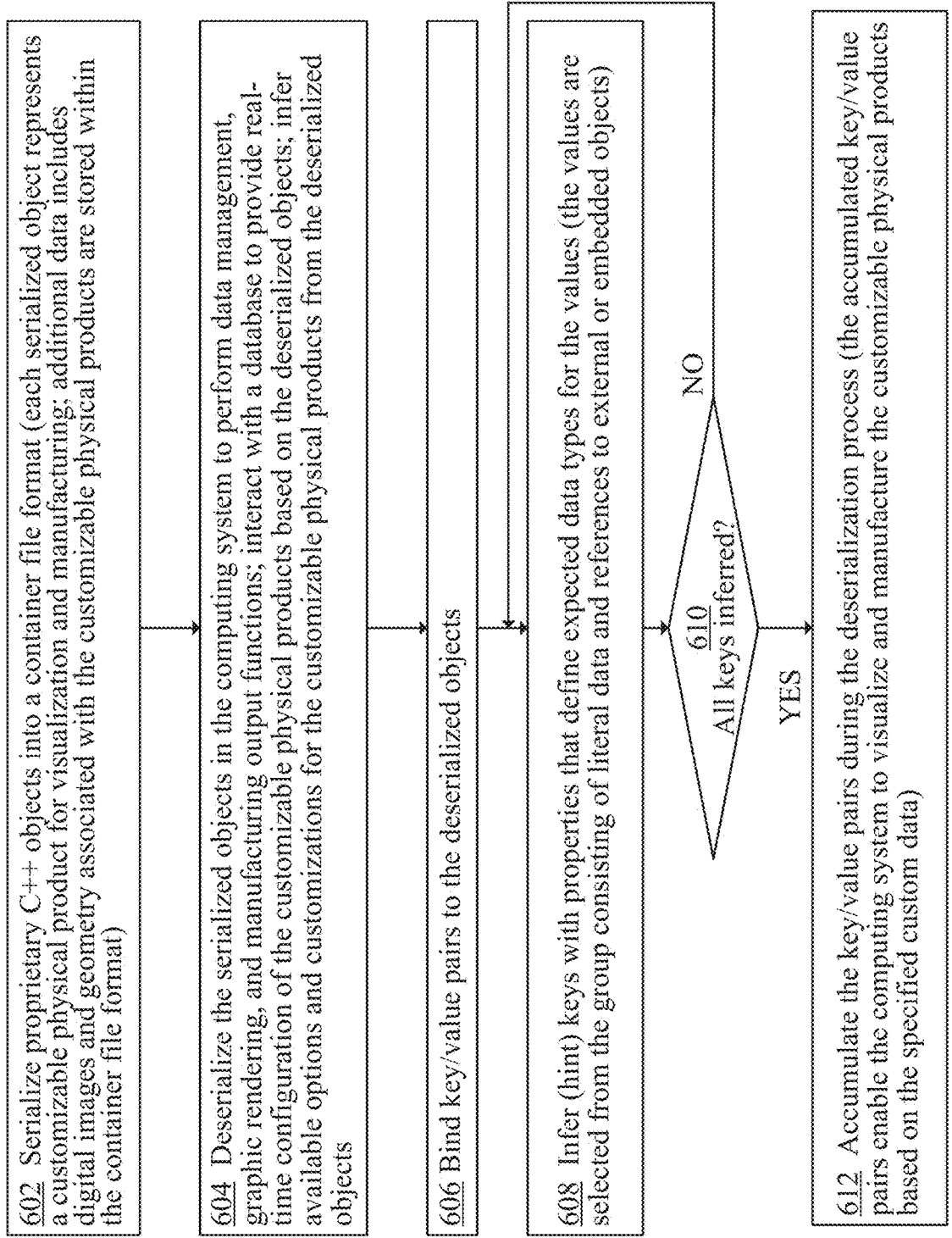
FIG. 6 is a flow chart depicting an example process for using containers for discovering, managing, and processing customizable product data in a computer system.

FIG. 6 is a flow chart depicting an example process for using containers for discovering, managing, and processing customizable product data in a computer system. In step 602, a computing system serializes proprietary objects into a container file format, wherein each serialized object represents a customizable physical or digital product for visualization and manufacturing.

In addition, in this step, the serialized objects are organized into a hierarchical tree structure within the container file format. The structure comprises a top-level root object containing a list of one or more child objects, each capable of containing its own objects.

In this step, additional data, including digital images and geometry associated with the customizable products, are stored within the container file format.

Additionally, the system generates a ZIG object hierarchy from manufacturing constraints, wherein the ZIG objects contain information needed to visualize and manufacture the customizable products.

In step 604, the serialized objects in the computing system are deserialized to perform data management, graphic rendering, and manufacturing output functions.

In this step, the system also interacts with a database to provide real-time configuration of the customizable products based on the deserialized objects.

Furthermore, the system infers available options and customizations for the customizable products from the deserialized objects.

In step 606, the system binds key/value pairs to the deserialized objects. Each key represents a customizable attribute, and each value represents customization data, which creates an interface for specifying custom data for visualization and manufacturing. The key/value pairs may be extracted from a serialized ZIG file by parsing an XML document representing the serialized objects.

The key/value pairs may also be extracted from a serialized ZIG file by deserializing the objects, querying the deserialized objects using object methods, and accessing data member variables directly.

In step 608, the system infers keys with properties that define expected data types for the values, wherein the values are selected from the group consisting of literal data and references to external or embedded objects.

If all keys are inferred, in step 612, the system accumulates the key/value pairs during the deserialization process. The accumulated key/value pairs enable the computing system to visualize and manufacture the customizable products based on the specified custom data.

In some embodiments, the customizable attribute represented by each key is specified by its name, and the value provided to the key is based on the type of data expected for the customizable attribute. Alternatively, each key associated with additional hinting may represent the customizable attribute that provides context for presenting a user interface or constraining input values.

Each key may represent the customizable attribute associated with a set of constraints derived from information provided by a manufacturer and information discovered from the ZIG objects relevant to the customizable products. The key/value pairs may be stored in a database, a primary source for coordinating user interfaces, generating manufacturing data, and processing logistics for customizable products.

The values for the key/value pairs can be literal data, such as text or RGB color, or references to external or embedded objects, such as image data.

The key/value pairs may be accumulated during the deserialization process, and they are used to determine or infer all of the options and customizations available for the customizable products.

11.0. Designing and Manufacturing Customizable Physical and Digital Products Using Containers In some embodiments, an approach for using functional data containers for designing, visualizing, and manufacturing a customizable physical or digital product is presented. The approach offers several technical effects. For example, the approach enables the receipt and deserialization of a functional data container file (i.e., a ZIG file) that contains serialized proprietary objects organized in a hierarchical tree structure. This allows for the instantiation of the hierarchical tree structure, providing a foundation for further processing.

The approach also involves binding key/value pairs to the deserialized C++ objects. These key/value pairs represent attributes of the customizable physical or digital physical or digital or digital product and customization data. By binding these pairs, the approach facilitates the customization and specification of unique product attributes.

Furthermore, the approach allows overriding default resource data embedded in a ZIG file with external key/value data inputs. This flexibility enables the customization of default visualization and customization options, providing users with greater control over the appearance and characteristics of the physical or digital physical or digital or digital product.

Moreover, the approach involves translating the key/value pairs into a set of manufacturing instructions in a compatible data format. The instructions are then transmitted to a manufacturing system, which can execute them to generate the customizable physical or digital or digital product. This streamlined process ensures accurate and efficient manufacturing based on the specified attributes and customization data.

Furthermore, the approach incorporates an imaging system to detect visual differences between the manufactured physical or digital or digital product and a synthetic rendering. This allows for quality control and verification, ensuring the final product aligns with the intended design and customization.

12.0. Example Collections Systems

In some embodiments, an approach for constructing a library of product+manufacturing instruction files is presented. The files may correspond to individual products. Each file may contain the product+manufacturing instructions that define the product and the key/value pairings that allow the manufacturing instructions to be edited. The instructions and key values may be used to determine, customize, and manufacture a product.

A list may define one or more products from the asset library. The products in the list may be selected based on their relevance to, for example, a specific collection of products or events. The list may define the products or sets of key-value-based manufacturing instructions that can be transformed and assembled to represent, for example, a particular product or event. The resulting file is a collection of product+manufacturing instruction sets that can be displayed as a dynamic composite image.

Representations of the products may be displayed using, for example, a user interface. The user interface may display the products' representation, which users may select based on their preferences or objectives. The user may select the products based on, for example, a common conception of what constitutes an appropriate group of products needed to fill a complex requirement (e.g., a set of wedding-based paper products). The products can also be chosen or defined by algorithms based on the user's previous interactions, purchases, or engagement with the products.

Each product (i.e., an asset) may contain unique resources that allow it to be transformed and customized separately or as a group within the collection of product+manufacturing instructions.

13.0. Collections

13.1. Overview

Contemporary digital asset management systems often organize and manipulate product information and associated instructions. These systems typically provide a means to store and edit product data, including customizing instructions through various associations. However, existing methods may lack the flexibility to dynamically represent and manipulate collections of products and their associated instructions in a manner that reflects specific themes or events. Furthermore, the transformation and assembly of these product collections into a cohesive visual representation pose challenges in terms of scalability, customization, and integration with external applications.

Additionally, editing and transforming the collections to meet specific aesthetic or functional requirements often requires complex interactions with digital environments. Users may need to manipulate individual or grouped assets, necessitating a system capable of handling layered object representations and transformations. The ability to save and apply these transformations in a manner that is both efficient and user-friendly supports streamlining the design and manufacturing process. Current systems may not adequately address the need for seamless integration of instructions with image assets, potentially hindering the user's ability to produce tailored and contextually relevant product representations.

The approach presented herein addresses these and similar issues. The approach is for arranging and transforming containers of product-manufacturing instructions and associated image assets. It includes defining multiple sets of product-manufacturing instructions in a list. Other information, such as background images, may also be included in the list.

13.2. Example Flow Chart

In some embodiments, the approach includes executing a special software application.

Figure 7:
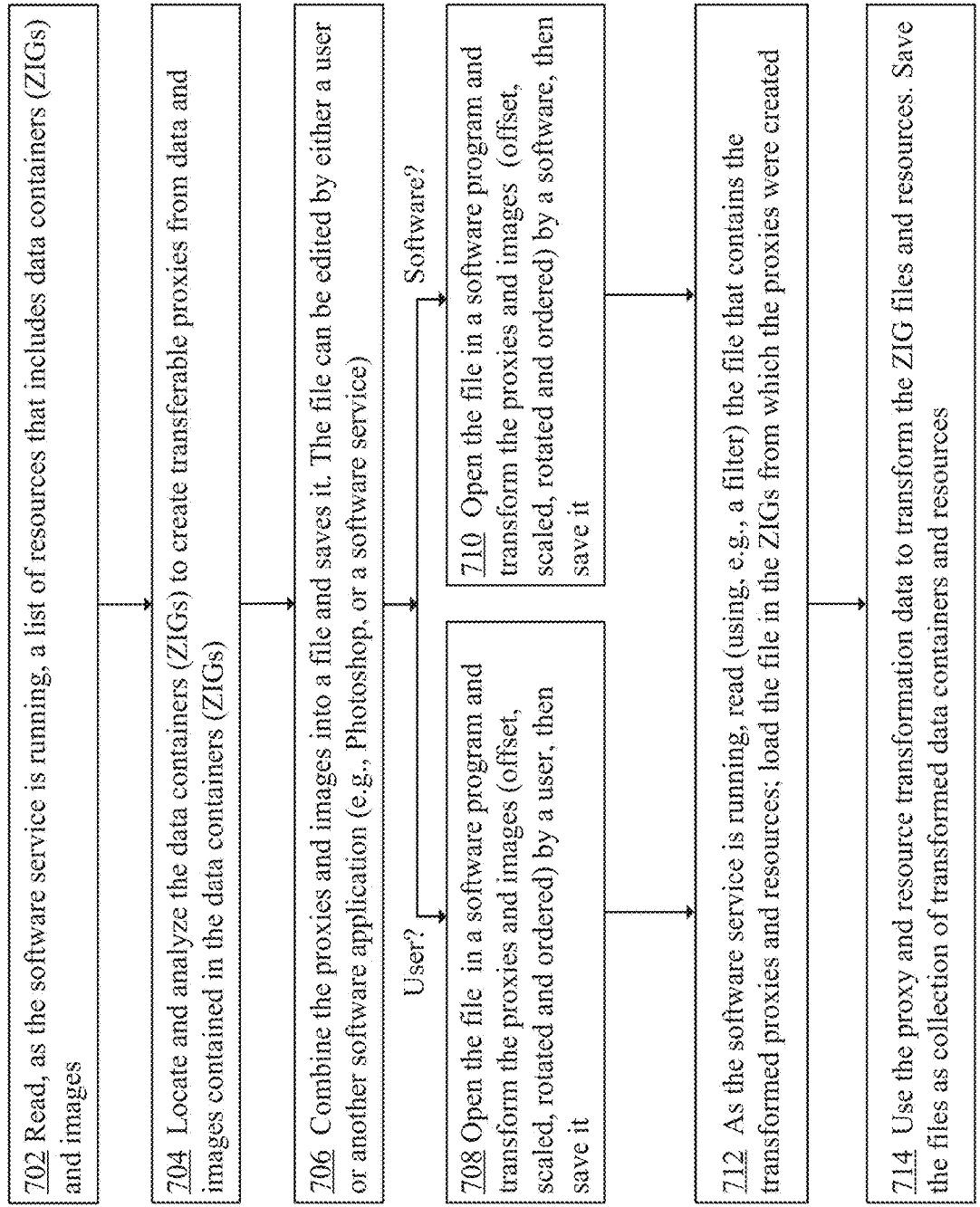
FIG. 7 is a flow chart depicting an example process for arranging and transforming containers.

FIG. 7 is a flow chart depicting an example process for arranging and transforming containers. In step 702, an application is initiated, which causes reading a list of resources that includes data containers (ZIGs) and images. The reading includes reading each set of product and manufacturing instructions.

In step 704, using product definition information from each of the sets of product+manufacturing instructions, the application causes generating a proxy representation of each set, which defines a transformation translation mechanism.

In step 706, the proxies and images are combined into a file, and saved. The collection of transformation translation proxies is encapsulated in a specified file format (e.g., Adobe's Photoshop PSD file format). That may include scaling data in each product+manufacturing instructions and additional imagery to automatically transform imagery and proxies to match a specific scale. Then, the file containing the proxies and images is saved. Each proxy may include one or more objects representing each product+manufacturing instruction set (e.g., images, vector paths, text, and the like) that may be manipulated as a single object. Each proxy is placed as a discrete layer within the file format that defines its Z-axis relationship with other proxies in the file.

At this point, the file can be used by either a user or other software applications.

If a user uses the file in step 708, the file is opened in a software application to edit the proxies. If the user opens the file in a software application such as Adobe's Photoshop, each proxy will appear as a "Layer." Each layer can be moved within the software interface to affect the order in which the proxies are stacked in the Z-axis. The visibility of the discrete proxy layer can be set to "not visible," which will set the product+manufacturing instruction set as "not visible" when the proxy file is read back into the software. The user can use the transform tools available in the application to transform the proxy objects (e.g., position, scale, rotation, and the like). A defined layout may also be used to automatically place and transform each proxy within the context of imagery in the file or relation to the other proxies.

Once the proxies have been edited, the file with the product+manufacturing instruction set proxies is saved.

If another software application uses the file, then, in step 710, the file is opened in the other application to edit the proxies. The other application can use the transform tools available in the application to transform the proxy object(s) (e.g., position, scale, rotation, and the like). A defined layout may also be used to automatically place and transform each proxy within the context of imagery in the file or relation to the other proxies.

Once the proxies have been edited, the file with the product+manufacturing instruction set proxies is saved.

In step 712, the proxy file is read along with the product+manufacturing instruction files used to generate the proxies. The transformations, layer ordering, and layer visibility defined in the third-party software (e.g., Photoshop) are applied to each product+manufacturing instruction object sets and other images and defined objects.

In addition, the software provides controls to edit the visibility and transformation settings of the product and manufacturing instruction object sets further. These transformation settings may be controlled or edited using key/value pairs unique to each set.

In step 714, the software encapsulates and saves a new file containing the entire image and product+manufacturing instruction sets. The resultant file containing the image data and product+manufacturing instructions for all specified products is saved on a server as part of a service. A service may make additional adjustments, transformations, or mappings using key values based on, for example, user information or other available data.

13.3. Second Example Flow Chart

Figure 8:
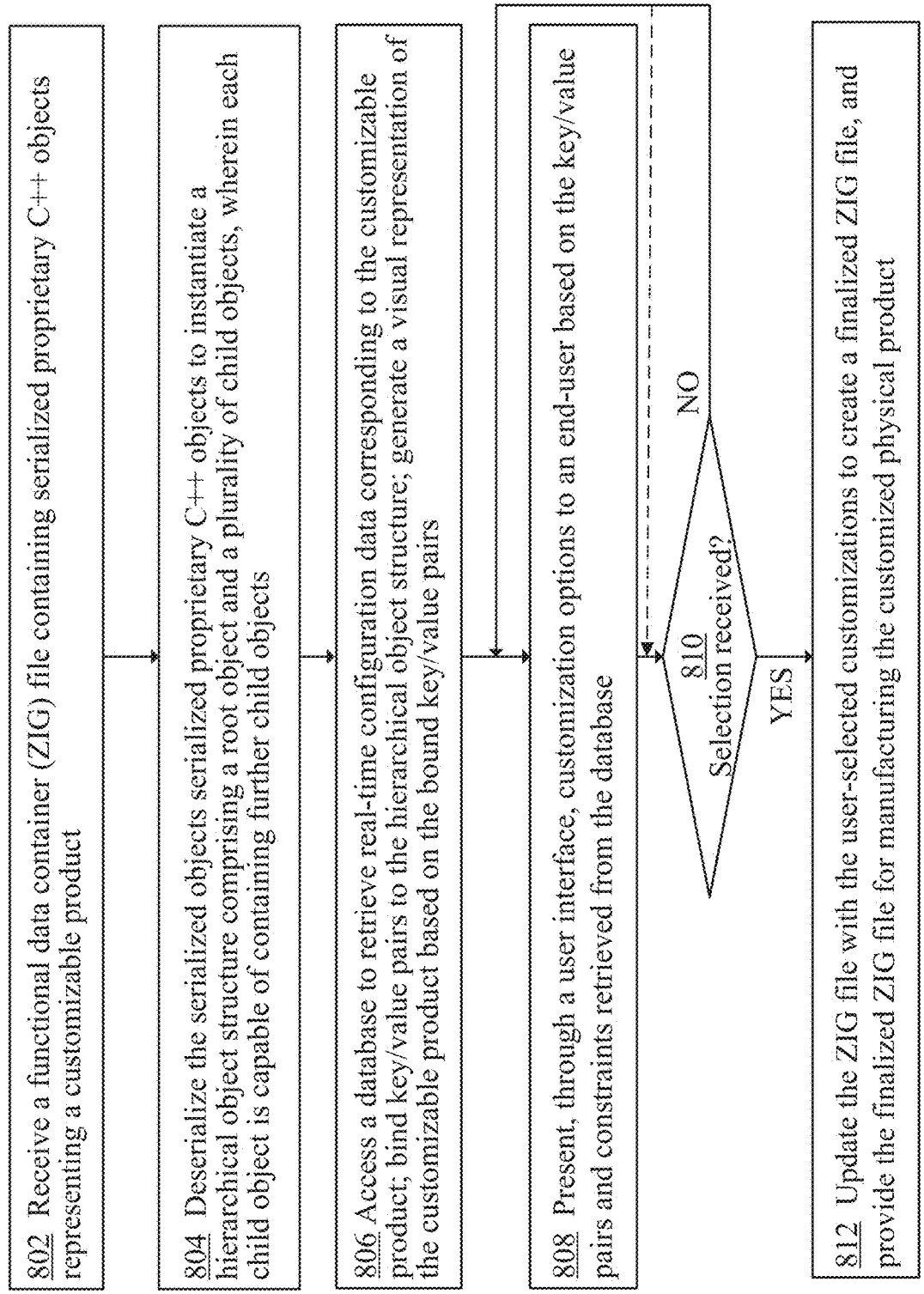
FIG. 8 is a flow chart depicting an example process for using containers to manage and visualize customizable physical and digital products.

FIG. 8 is a flow chart depicting an example process for using containers to manage and visualize customizable physical or digital or digital products. In step 802, a computer system receives a functional data container (ZIG) file containing serialized proprietary objects representing a customizable product.

In step 804, the computer system deserializes the serialized proprietary objects to instantiate a hierarchical object structure comprising a root object and a plurality of child objects, wherein each child object can contain further child objects.

The functional data container (ZIG) file may be serialized into XML format, while the deserialization may include parsing the XML document to extract the serialized proprietary objects.

In step 806, the computer system accesses a database to retrieve real-time configuration data corresponding to the customizable product. The database is usually a primary source for coordinating the creation of user interfaces, generating manufacturing data, and processing logistics for the customizable product.

The computer system also binds key/value pairs to the hierarchical object structure in this step. The keys are usually attributes of the objects, and the values are selected from the group consisting of literal data and references to external or embedded objects. The key/value pairs are bound to the hierarchical object structure based on information provided by the manufacturer and information discovered from the ZIG objects.

Furthermore, in this step, the computer system generates a visual representation of the customizable product based on the bound key/value pairs. The visual representation of the customizable product may include rendering custom artwork on a printable area of the product In step 808, the computer system presents an end-user with customization options through a user interface based on the key/value pairs and constraints retrieved from the database.

The customization options presented to the end-user may include selecting colors, dimensions, or materials for the customizable product.

In step 810, the computer system tests whether user-selected customizations for the customizable product have been received. If it has, then step 812 is performed. Otherwise, either step 808 is repeated, or the computer system awaits the selection in step 810

In step 812, the computer system updates the ZIG file with the user-selected customizations to create a finalized ZIG file. The finalized ZIG file may include the user-selected customizations and additional resources embedded in the ZIG file.

This step may include validating the user-selected customizations based on predetermined constraints associated with the customizable product.

In this step, the computer system also provides the finalized ZIG file for manufacturing the customized physical or digital product. This step may also include generating manufacturing data based on the user-selected customizations and the hierarchical object structure. The manufacturing of the customized physical or digital product may include printing the visual representation on a physical or digital medium.

14.0. Example Computer Environments

In some embodiments, the presented approach is implemented in a product collaboration platform. The platform allows users, designers, customers, and support engineers to, for example, design and create digital product designs. FIG. 1 describes a computer environment for creating digital designs, manufacturing products, and the like FIG. 1.

A digital design for a product may be captured in, for example, product description data. A hyperlink to the particular location may be created and transmitted from the collaboration platform to a manufacturing server to cause the manufacturing server to generate a final product based on the digital design.

A product may be digital, such as a digital gift card, or physical or digital, such as a physical or digital t-shirt.

FIG. 1 is a block diagram showing an example computer environment. In FIG. 1, users 10 are individuals who create and design digital designs of products; clients 12 correspond to software applications configured to facilitate communications between users 10 and front-end servers 14; core services 16 correspond to software applications and tools configured to facilitate creating and designing of the digital designs and generating manufacturing instructions for manufacturing final products based on the digital designs; and manufacturing 18 corresponds to manufacturing servers and applications configured to manufacture, or cause manufacturing, the final products, and the like.

14.1. User Devices

FIG. 1 depicts several examples of users 10. Each user 10 may use its own or shared computer device. Examples of user devices are described later in FIG. 2 (see devices 140A-G).

In some embodiments, examples of user 10 are determined based on the roles that may be assigned to the users. Examples 10A of roles may include a shopper, a client, a designer, a client peer, a customer support engineer, a recipient, and the like.

14.2. Client Applications

Clients 12 in FIG. 1 refer to client applications implemented in client servers 14 and configured to support requests received from users 10A. Non-limiting examples of clients 12 may include iOS applications 12A, Android applications 12B, Web applications 12C, and the like.

14.3. Front and End Servers

Front and end servers 14 refer to computer-based servers configured to process requests received from clients 12 and, in many cases, interact with core services 16 to further resolve these requests. Examples of front-end servers 14 include one or more WWW servers 14A, one or more application servers 14B, and one or more cryptographic servers 14C. Cryptographic servers 14C may be configured to provide cryptographic services for encrypting/decrypting, transmitting, or otherwise communicating data between the entities depicted in FIG. 1.

14.4. Core Services

Core services 16 in FIG. 1 refer to servers and services implemented in a role-based collaboration platform configured to provide functionalities for creating and designing digital designs, handle collaboration requests, and facilitate the customization requests received from users 10.

In some embodiments, a customization process performed by a user of users 10, intended to generate a digital design of a customized product, is captured in so-called product description data, which may be translated into a manufacturing description comprising product and manufacturing instructions.

The product and manufacturing instructions may include digital design specifications, data, and code needed to manufacture a custom product. That may include instructions for generating, for example, a 3D geometry for digital final products. This may also include generating instructions for generating 2D and 3D patterns that may be used to cut, cast, or form physical or digital components of physical or digital final products. The patterns may be parametric, i.e., they may have parameters that, through encoded relationships, adjust the form of the pattern for a specific need.

For instance, a set of 2D patterns for a t-shirt graded based on size may become a parametric pattern by interpolating grade curvatures. A single parametric value, usually called a 'size,' may set the automatic grading.

The product instructions may also include 2D and 3D models used to form, through additive manufacturing or subtractive manufacturing, portions of a product. The models may be parametric, i.e., they may have parameters that, through coded relationships, adjust the form of the model for a specific need. For instance, a set of 3D models may represent a bike helmet. Each model may fit a statistically normed human head of a particular age. A coded relationship between the models may allow for interpolating the set of models for a particular age. A single parametric value may set the automatic interpolation. The single parametric value, in this case, is usually called an 'age.'

The product instructions may also include material properties, such as the physical or digital material used to form a product from a pattern. Some material properties may be parametric, i.e., they may be selected or changed during the manufacturing process.

The properties may also include a body color. For instance, the color of a fabric may be selected for manufacturing a t-shirt. According to another example, the plastic color may be selected for manufacturing a bike helmet.

The properties may also include a body texture, such as the fabric weave of a t-shirt, which may be specified to be smooth or slubby. For instance, the surface of a plastic bike helmet may be polished or satin. Each property is necessarily specific to each class of materials.

Examples of materials and properties may include a fabric (such as a weave or knit type, a fiber type (e.g., cotton, wool, flax, polyester, polypropylene), a thread size, a thread count, a color, an integral design (e.g., ikat, knit, tapestry, etc.), a bolt width, a selvage type, a surface (e.g., hand), and the like.

The properties may also include plastics, which may include sub-properties such as color, surface quality (e.g., a bidirectional luminance function), melting point, impact resistance, a forming method (e.g., thermoplastic, cast, etc.), a type (e.g., acrylic, polypropylene, etc.), and the like.

The properties may also include metals, which may include sub-properties such as a type (e.g., aluminum, steel, copper, brass, etc.), a color, a surface quality (e.g., a bidirectional luminance function), a melting point, a tensile strength, a shear strength, toxicity, and the like.

The properties may also include non-woven specified by a type (paper, felt, Tyvek, etc.), a color, a surface quality (e.g., a bidirectional luminance function), a surface type (e.g., hot pressed, natural, textured, etc.), a weight per square meter, an acid content, a compatible media, coating, and the like.

The properties may also include metamaterials that may be described as a combination of multiple materials created during manufacturing. For instance, plastics with various properties may be mixed during fused deposition manufacturing to provide a physical or digital product with gradations of flexibility, durometer, and the like. According to another example, a mix of metal alloys with various properties may be deposited during the laser sintering of metals, resulting in a product composed of gradations of metallic properties. According to yet another example, during high-resolution uv-printing, layers of the uv-cured material with different refractive indices may be deposited, resulting in a large variety of optical effects.

The properties may also include embellishments such as trim colors, designs, and applied ornaments. The trim colors may indicate the color of the edging around the sleeve of a T-shirt, the color of the trim around the base of a bike helmet, and the like.

The designs may indicate a custom printed front of a t-shirt, a custom thermal printed design to the side of a bike helmet, and the like.

The applied ornaments may indicate rhinestones on a t-shirt, holographic spangles on a bike helmet, and the like.

Some properties may apply to a large class of products and allow for a limited set of properties to be transferred from one product to another. Other properties may be specific to a particular product or manufacturing method.

It may be appreciated that much of the novel art of the system and method is in enumerating the constraints imposed by manufacturing a specific custom product and crafting these constraints as a set of product option key/value pairs. These manufacturing constraints are propagated through the entire system and method, and using these product option key-values allows for manufacturing a series of custom products that meet these physical or digital constraints.

Referring again to FIG. 1, in some embodiments, core services 16 refer to services implemented in a role-based collaboration platform. In the example, core services 16 may be provided by one or more real-view (RLV) servers 16A and a product option framework 16AA. RLV servers 16A and product options framework 16AA may use one or more data tier databases 16B, including RLV Data 16C, a product options database 16D, a transaction database 16E, and the like.

In some embodiments, core services 16 may also utilize internal tools 16F, such as computational photographic tools 16E, customer support tools 16G, launch pads tools 16H, etc.

Product option framework 16AA is also called a persistent design data framework. The framework data may include a product options set, which may include a set of product options pertaining to a specific product type. It usually contains the product instructions (e.g., collaboration components 106 in FIG. 2) for manufacturing or producing the product.

In some embodiments, product options framework 16AA is configured to provide services for transforming ProductOption key/value pairs (i.e., manufacturing constraints) from one product to the other. Transforming the ProductOption key/value pairs from one product to another may require, for example, transforming the color space (i.e., sRGB to CMYK US Web Coated (SWOP) v2), transforming an image from raster to vector, and resizing the image for the fit.

In some embodiments, there are two basic types of product instructions: (1) fixed (which includes the instructions for the product that are fixed and not customized) and (2) custom (which contains the logic to transform a user interface parameter into a product instruction).

In some embodiments, the product option set contains the logic to enumerate each customizable option in a manner that presents a complete user interface to change the parametric product instructions.

The instructions for manufacturing a customized product are usually parametric. The parameters include the size of the customized product (this can be multi-dimensional and include width, height, and depth). The parameters may also relate to human size or age. The parameters may also be custom and based on biometric information.

The parameters may also include a component body color, a component body texture, a trim body color, a trim body texture, a design area, and the like.

In some embodiments, a product option may be represented as a key/value pair. The key/value pair is a label that may span individual products and represent a class of products. The keys of pairs may include a material type, a color, a size, and the like.

The value in a key/value pair is a specific discrete or continuous value that sets a manufacturing instruction. Examples of discrete (enumerated) values may include a discrete type of fabric such as cotton, cotton-polyester blend, silk, and the like. The discrete values may also include specific colors, such as white, navy, black, and the like.

Examples of continuous values of key/value pairs may include a single element, such as length or a ribbon, a vector, such as the size of a frame for a print (width (in inches) or height (in inches)), or the size of a box for the European countries, such as a size of a box for the EU (width (in millimeters), height (in millimeters), depth (in millimeters)).

The values may also reference a known file type, such as an image for the t-shirt design, an embroidery file for the back of a jacket, an engraving design for a bracelet, and the like.

In some embodiments, values in key/value pairs may include a set of graphic primitives for a design, such as an image, a line, a circle, a rectangle, a text, a group, and the like.

The product option key values may have default values. Default values are pre-set values that will produce a product without changing any key/value pairs through customization. When key values are changed, they may produce a product option framework event chain. A product options framework event chain is a journal of each key-value change ordered in time.

A product type may be represented by a product option key-value. Using this option type, one product type may be associated with another through a well-known relationship.

In some embodiments, a product options framework event chain includes one or more products, and the chain may represent or memorialize an event. The products may represent or memorialize an event. Examples of events may include weddings, birthdays, anniversaries, graduations, national holidays, reunions, and the like.

Many products fit into an event chain. For example, the products that fit into a wedding event may include the following products: save the date products, invitations, RSVPs, bachelor party invite products, bachelorette party invite products, party favors products, gift registry cards, place cards, napkins, wedding programs, wedding gifts, thank-you cards, wedding keepsake photos, and the like.

Examples of products that may be appropriate for a birthday event include invitations, RSVPs, party bags, party keepsake photos, and the like.

In some embodiments, in a product option set event chain, a key/value pair encodes the next product in the chain. For example, an invitation may be chained to an RSVP card. A key-value may also encode the role of the chained event. For example, a chained RSVP card key-value may further include a recipient of the invitation as the sender role for the RSVP card.

A key/value pair may also encode the shared properties used to set the chained product's properties. For instance, a design for the invitation may be shared with the RSVP card. A key-value may also encode the timing for the chained product. Typically, the event chain properties are custom (e.g., parametric), and a product designer may change them to fit a specific product set.

In an embodiment, a product option framework is configured to generate a product option framework user interface. Accordingly, each product option set is associated with logic and code to build a user interface element for each parametric product option. Furthermore, each product options set contains style hints so that each user interface element may be artfully placed to produce a high-quality user experience.

Typically, user interface elements are designed to match each class of values in all products covered by a product options framework. New user interface elements may be added as the product categories expand. The user interface elements may include a design view, a color editor, a font editor, a size selector, a texture selector, a text editor, a fabric swatch selector, a product configurable image, and the like.

In some embodiments, a product options framework cooperates with a user product renderer that may be implemented in, for example, a RealView server 16A. The user product renderer may be configured to render views of a custom product as it is already manufactured. Typically, it uses a product option set of key-values as input. It creates one or more run-time assets using computational photography of the manufactured product.

15.0. Example Manufacturing System

Referring again to FIG. 1, manufacturing instructions may be communicated from core services 16 to manufacturing 18, including one or more manufacturing servers 16AAA. Servers 16AAA may receive the manufacturing instructions, process the instructions, and communicate with a vendor manufacturing application 18A to generate, for example, manufacturing data, operator directions, tool/machine codes, and the like. The application may also generate information about an order state, a packing slip, a production sheet, etc. Some of that information may be communicated to a carrier (shipping) service selected to deliver the final products to the recipients.

A final product may be manufactured using markups. A markup for, for example, a body color of a product may be made by specifying a distinct and separate color for the BodyColor key-value. A markup for the trim color of a product may be made by specifying a distinct and separate color for, for example, a TrimColor key/value pair. A markup for a design area of a product may be made by specifying a specific marker type (e.g., a removable linear markup, a digital markup, or a digital field markup) for a design-area image.

As described above, a manufacturing process may pertain to manufacturing a digital product as well as manufacturing a physical or digital product. Since the manufacturing instructions for generating a product are generated based on a plurality of key/value pairs for a digital design of the product, in some situations, the same manufacturing instructions may be used to manufacture the digital product as well as to manufacture the physical or digital product.

Then, the manufacturing system may traverse the images stored in the local image cache and determine an optimal color palette for that collection of images.

Subsequently, the manufacturing system may convert the images in the local image cache from 32-bit RGBA format to 8-bit Indexed color.

Then, the manufacturing system may embed a digital watermark that encodes the input KeyValueJournal's UUID in the 8-bit indexed color image cache.

Next, the manufacturing system may begin encoding the image file. For example, the manufacturing system may write the header bytes, write the Logical Screen Descriptor bytes, write the found color palette as a gif Global Color Table, write the gif 8-bit character application name, and embed metadata as a comment (or a watermark) which encodes the input Key ValueJournal's UUID.

Next, the manufacturing system sets a FrameCount to 1 and proceeds to process each frame in the image file. The processing includes checking if there is an image in the 8-bit indexed color image cache; if so, the manufacturing system continues; otherwise, it proceeds to take the next image.

To continue, the manufacturing system writes the GIF Graphic Control Description for the FrameCount and then processes the first 8-bit indexed color image cache into blocks of 255 LZW compressed bytes.

Next, the manufacturing system writes the compressed bytes and removes the first image from the 8-bit indexed color image cache. Then, the manufacturing system increments the FrameCount and repeats the process for the next frame.

Once the manufacturing system processes all frames, it writes the file terminator (such as an ASCII code for zero) to the image file and outputs the manufactured GIF product.

At this point, executing the manufacturing instructions to manufacture the product ends, and the product's manufacturing is completed.

16.0. Example Product Collaboration Platform

In some embodiments, the approach presented herein is implemented in computer systems hosting a product collaboration platform. Alternatively, the approach may be implemented in one or more computer systems that communicate with the collaboration platform but that do not actually host the platform itself. For the clarity of the description, it is assumed that the computer environment supporting the approach presented herein is implemented in the product collaboration platform.

Figure 2:
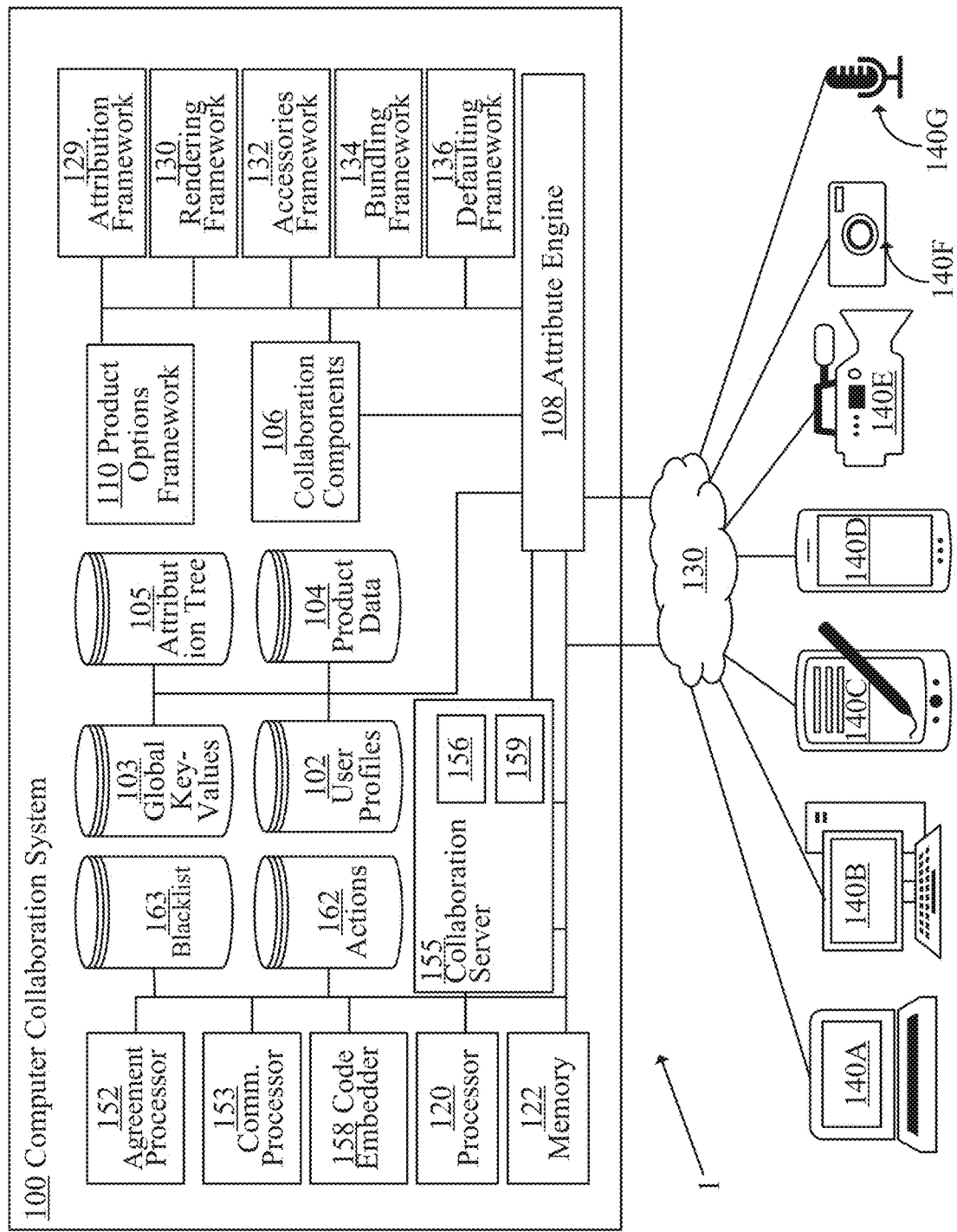
FIG. 2 is a block diagram showing an example of collaboration platform.

FIG. 2 is a block diagram showing an example of the collaboration platform. FIG. 2 is a block diagram showing an example of a role-based collaboration platform. In the example depicted in FIG. 2, a computer collaboration system 100 includes a user profiles database 102, a global-key-values database 103, a product data definitions database 104, an attribution trees database 105, collaboration components 106, a product options framework 110, an attribute engine 108, one or more processors 120, one or more memory units 122, and one or more frameworks 129-136.

Furthermore, computer collaboration system 100 includes a collaboration server 155 (including a monitoring system 156 and a request analyzer 159), one or more blacklist databases 163, one or more actions databases 162, an agreement processor 152, a communications processor 153, and a code embedder 158. Computer collaboration system 100 may communicate directly or via one or more communications networks 130, with one or more user computers 140A-140G, all described in detail later.

Computer collaboration system 100, shown in FIG. 2, is provided herein to illustrate clear examples and should not be considered limiting. Other computer collaboration systems may include additional components such as computer servers, various input/output devices, and additional software and hardware components not depicted in FIG. 2. Other computer collaboration systems may be implemented in cloud-based systems, distributed computer networks, etc. Other computer collaboration systems may include fewer components than, for example, computer collaboration system 100, as shown in FIG. 2.

Digital product collaboration platform 100, shown in FIG. 2, may support a variety of collaboration sessions. The sessions may be established between two or more users, and the types of collaboration sessions may depend on the roles assigned to the users who participate in them.

Referring again to FIG. 2, digital product collaboration platform 100 is provided herein to illustrate clear examples and should not be considered limiting. Other computer collaboration systems may include additional components such as computer servers, various input/output devices, and additional software and hardware components not depicted in FIG. 2. Other computer collaboration systems may be implemented in cloud-based systems, distributed computer networks, etc. Other computer collaboration systems may include fewer components than, for example, the digital product collaboration platform 100 shown in FIG. 2.

Attribute engine 108 may be configured to facilitate role-based collaboration of customizable products according to roles assigned to users and according to manufacturing constraints set forth for the products. Attribute engine 108 may be configured to, for example, interact with collaboration components 106, product options framework 110, frameworks 130-136, and user devices 140A-140D to allow the users using devices 140A-140G to collaborate in customizing interactive designs offered by platform 10.

In some embodiments, attribute engine 108 may be configured to interact directly with users of user devices 140A-140G. In other embodiments, attribute engine 108 may be configured to interact with users of user devices 140A-140G via a computer network 131, as shown in FIG. 2.

In some embodiments, attribute engine 108 comprises various additional components, including a database interface (not shown), a manufacturing interface (now shown), an imaging device (not shown), a graphical representation module (not shown), a correlation module (not shown), and an instructions generating module (not shown). Other additional components may also be included in attribute engine 108.

A database interface may be configured to interact with ZIG files, providing real-time configuration data for customizing the products.

A manufacturing interface may be configured to translate the key/value pairs from the ZIG files into a plurality of manufacturing instructions compatible with executable programs of a manufacturing system for creating a corresponding product.

An imaging device may be configured to detect visual differences between the manufactured product and a synthetic rendering of the custom product.

A graphical representation module may be configured to construct a graphical representation of the product using a plurality of modified key/value pairs to indicate changes in appearance between the manufactured product and the synthetic rendering.

To determine differences, a correlation module may be configured to correlate the modified key/value pairs with the original key/value pairs.

An instruction generation module may be configured to generate additional manufacturing instructions based on the determined differences; enabling the manufacturing system to produce a product more closely resembles the synthetic rendering of the custom product.

Computer network 131 may be implemented as any type of communications network, including a local area network (LAN), wide area network (WAN), wireless network, secure virtual LAN (vLAN), secure virtual WAN (vWAN), and the like.

User devices 140A-140G may include any communications devices configured to facilitate communications between users and digital product collaboration platform 100. In the example depicted in FIG. 2, a user device 140A is a laptop, a user device 140B is a personal computer, a user device 140C is a personal assistant device, a user device 140D is a mobile device such as a smartphone, a user device 140E is a video camera, a user device 140F is a digital camera, and a user device 140G is a microphone configured to capture audio data and communicate the audio data to digital product collaboration platform 100.

The types and counts of user devices 140A-140G are not limited to the examples shown in FIG. 2. For example, even though FIG. 2 depicts only one laptop 140A, one personal computer 140B, one personal assistant 140C, one smartphone 140D, one video camera 140E, one digital camera 140F, and one microphone 140G, platform 100 may include a plurality of laptops 140A, a plurality of personal computers 140B, a plurality of personal assistants 140C, a plurality of smartphones 140D, a plurality of video cameras 140E, a plurality of digital cameras 140F, and a plurality of microphones 140G. In other examples, user devices may include fewer devices than those depicted in FIG. 2. In other examples, the user devices may include devices not depicted in FIG. 2.

Collaboration server 155 may be implemented in software, hardware, or both. It may be configured to cooperate with monitoring system 156 to provide monitoring capabilities to platform operators and a third-party monitoring service. The capabilities may include the ability to intercept the contents of communications exchanged between the collaboration platform users, determine whether the communications meet the terms of the collaboration agreements, and pursue actions to address violations when the communications fail to meet the rules set forth in the agreements.

Collaboration server 155 may be part of digital product collaboration platform 100, as shown in FIG. 2. Alternatively, a collaboration server may be a system implemented in a computer server (not shown) that is separate from digital product collaboration platform 100.

Collaboration server 155 may comprise monitoring system 156iments in some embodiments, as shown in FIG. 2. In other embodiments, collaboration server 155 may be separate from monitoring system 156.

In some embodiments, collaboration server 155 is configured to transform ownership and license agreements, embedded in a plurality of key/value pairs journaled during a collaboration session between collaborators, into a graph-network and then into an ownership-agreement tree. The ownership-agreement tree may be used to represent the ownership and license agreements between the collaborators participating in the collaboration session.

Collaboration server 155 may also be configured to evaluate the ownership-agreement tree with respect to a plurality of role-based communications channels established between the collaborators for each constraint of a plurality of constraints on each collaborator of the collaborators.

The constraints may be identified from the ownership agreement tree. They may include rules, guidance, conditions, specifications, and provisions that set forth how collaborators may communicate with each other during collaboration sessions. Examples of constraints may include agreement constraints (such as ownership agreements, license agreements, and the like), use constraints (that impose limits on editing and modifying design elements produced by collaborators), communications constraints (that impose limits to durations of the sessions, inactivity during the sessions, and the like), interactions constraints (such as contractual constraints and professional-conduct constraints), and content constraints (imposing blacklists and whitelists on the communications). Some of the constraints may be system-wide constraints and apply to one or more, or all, collaborations supported by a collaboration platform.

In some embodiments, monitoring system 156 is implemented as a component of collaboration server 155, as shown in FIG. 2. In other embodiments, monitoring system 156 is implemented as a server (not shown) separate from collaboration server 155.

Monitoring system 156 may be configured to cooperate with collaboration server 155 in terms of tracking and monitoring the communications exchanged between collaborators, generating transcripts of the communications, and parsing the transcripts to determine the characteristics of the corresponding data streams.

Monitoring system 156 may also be configured to assist collaboration server 155 in evaluating an ownership-agreement tree with respect to role-based communications channels established between the collaborators to determine whether any communications exchanged between the collaborators violate any constraints of a plurality of constraints.

In some embodiments, digital product collaboration platform 100 comprises agreement processor 152, communications processor 153, processor 120, and monitoring system 156. Among other things, components 152-153, 120, and 156 are configured to support collaboration server 155 in journaling key/value pairs that capture ownership and license agreements. They may also be configured to transform the key/value pairs into a graph network and then into an ownership-agreement tree.

Components 152-153, 120, and 156 may also be configured to support collaboration server 155 in evaluating the ownership-agreement tree with respect to a plurality of role-based communications channels established between the collaborators for each constraint on each collaborator.

Moreover, components 152-153, 120, and 156 may support collaboration server 155 in determining whether one or more communications, monitored in the plurality of role-based communications channels, violate one or more constraints of the plurality of constraints.

That determination may include, among other things, generating transcripts of data intercepted from data communications channels supporting communications sessions established between collaborators. For example, components 152-153, 156, and 120 may generate a video transcript of the video chat and associate the transcript with the corresponding collaboration session. Components 152-153, 120, and 156 may provide the transcript's content, including video frames, audio clips, and chat texts, to monitoring system 156 and collaboration server 155.

Components 152-153, 120, and 156 may also be configured to collect statistical and diagnostic information about communications sessions established to support collaboration between users. For a communications session, the information may include information about the duration of the session, a count of retransmissions performed during the session, an indication of whether the session ended abruptly, and the like.

17.0. Embedding and Referencing Zig Files

In some embodiments, embedded and referenced ZIGs are used for dynamic visualization and manufacturing of customizable products. This disclosure relates to digital content creation and management, specifically the embedding and referencing customizable geometry objects within a digital file format for visualization and manufacturing.

Contemporary digital representation systems for customizable items often encapsulate structural elements and associated descriptive information to depict a single item within a specific setting. These systems facilitate the visualization of items in diverse configurations, which is significant for display and production processes. Customization within these systems is typically achieved through associations that apply particular data to designated elements or regions. Creating such digital representations involves initial steps that can be resource-intensive, particularly when incorporating new elements into an existing representation.

Furthermore, integrating additional elements into a digital representation, whether for aesthetic enhancement or to demonstrate product variations, often requires the recreation of the entire scene, including all initial elements and processes. This method can be cumbersome and inefficient, especially when handling multiple elements or striving to maintain consistency across various representations. Additionally, when amalgamating numerous elements, the management of associations within these systems poses challenges in preserving the distinctiveness of associations and ensuring precise depiction and production of the customizable items. These challenges highlight the need for a more efficient and dynamic approach to managing and visualizing customizable items within digital representations.

17.1. Technical Problem-Technical Solution

The act of customizing and visualizing products in digital environments is not just a passing trend, but a crucial aspect for various industries, including manufacturing and design. Traditionally, product representations are created using digital files that contain geometry and associated metadata to depict the product accurately. These files are used to visualize the product for customer preview and to generate manufacturing data for production. However, the process of customizing and visualizing products often encounters significant challenges when integrating multiple objects into a single scene or applying changes to a product's design, thereby underscoring the vital need for innovative solutions.

Existing product visualization and customization systems typically require extensive manual intervention to combine different objects into a coherent scene. When additional objects or variations of a product are needed, the entire scene often necessitates recreation from scratch, including the setup of the physical or digital environment, lighting, and camera angles for photography, followed by image and data processing. This process is time-consuming and prone to inconsistencies, as recreating the exact conditions of the original scene is difficult. Furthermore, the customization of products using value pairs is limited by the inability to efficiently manage and apply these pairs when multiple objects share the same values within a scene. These limitations result in a cumbersome and inefficient workflow, hindering the ability to quickly produce realistic visualizations and accurate manufacturing data for customized products.

The present system introduces a novel approach to customizing and visualizing products within a functional data (ZIG) file system. The system leverages the concept of embedding and referencing ZIG content to streamline the integration of multiple objects into a single visualization. By utilizing identifier/value pairs for customization and applying a scoping mechanism, the system ensures the uniqueness of identifier/value pairs when combining multiple ZIG objects. This approach allows for transforming additional ZIG content within a container ZIG file, adjusting position, scale, and rotation for realistic placement within a visualization. The system also separates visualization data from manufacturing data, retaining the original specifications for manufacturing purposes. This innovative method enhances the efficiency and consistency of product customization and visualization, providing a photorealistic effect through advanced rendering techniques while maintaining the integrity of manufacturing data.

17.2. Technical Effects

By embedding or referencing additional ZIG content into a container ZIG file, the method enables the augmentation of a product visualization scene without additional photography or scene recreation. This allows for a more efficient and streamlined process of generating complex visualizations of customizable products.

The application of a scoping mechanism to key/value pairs ensures that when multiple ZIG objects are combined within a single container ZIG file, each object maintains its unique customization data. This prevents data collision and allows for accurate and individualized customization of each product within the visualization.

The transformation of additional ZIG content within the container ZIG file based on scoped key/value pairs facilitates the realistic placement of objects within a visualization. This includes adjusting the position, scale, and rotation of objects, contributing to creating a cohesive and lifelike scene that enhances the user's visual experience.

Generating a visualization using a rendering engine that matches lighting and shadows achieves a photorealistic effect, which is crucial for providing users with a high-fidelity representation of the final customized product. This level of detail in the visualization can aid decision-making and increase customer satisfaction with the customized product.

Retaining separate manufacturing data distinct from the visualization data ensures that the manufacturing process remains true to the original product specifications. This separation allows for the accurate production of the customized product, regardless of the complexity of the visualization or the number of combined ZIG objects.

17.3. Embedding Summary

In some embodiments, a computer-implemented method for customizing and visualizing products within a functional data (ZIG) file system comprises receiving a container ZIG file including at least one geometry object and associated metadata; identifying key/value pairs associated with the container ZIG file for customization of the at least one geometry object.

The method further comprises embedding or referencing additional ZIG content into the container ZIG file by inserting contents of an external ZIG file into the hierarchy of the container ZIG file for embedding, and creating a placeholder geometry referred to as a symbol for referencing. It also comprises applying a scoping mechanism to the key/value pairs to maintain uniqueness when combining multiple ZIG objects within the container ZIG file.

The method also comprises transforming the additional ZIG content within the container ZIG file based on the scoped key/value pairs to adjust position, scale, and rotation for realistic placement within a visualization.

The method further comprises generating a visualization of the container ZIG file with the embedded or referenced additional ZIG content using a rendering engine configured to match lighting and shadows for a photorealistic effect; and retaining separate manufacturing data based on original specifications of the geometry objects for manufacturing purposes, wherein the manufacturing data is distinct from the visualization data. The associated metadata may include at least one image data, color profiles, material properties, or text annotations.

The method also comprises automatically identifying and associating key/value pairs with specific geometry objects based on predefined rules or attributes of the geometry objects. The embedding process includes resolving naming conflicts for resources by appending a unique identifier to the names of the resources from the external ZIG file. The placeholder geometry for referencing additional ZIG content is created based on user-defined layer information and default transformation parameters for placement and scale.

The scoping mechanism prefixes a scope name to a key name, the scope name being derived from a unique identifier associated with the container ZIG file.

Transforming the additional ZIG content includes applying a transformation matrix to the geometry objects based on the scoped key/value pairs.

The rendering engine is further configured to utilize ray tracing or global illumination techniques to enhance the visualization's photorealistic effect.

The method further comprises maintaining separate manufacturing data in a version-controlled repository, wherein the manufacturing data is synchronized with updates to the visualization data.

In some embodiments, a file system comprises a data processing system configured to manage ZIG files containing geometry objects and associated metadata, and to apply customization to said objects using key/value pairs.

The file system also comprises a rendering engine operatively connected to the data processing system, configured to generate visualizations of the ZIG files and to match lighting and shadows for a photorealistic effect.

The file system further comprises a transformation system coupled to the rendering engine, configured to apply transformations to objects within the ZIG files based on key/value pairs to adjust position, scale, and rotation for realistic placement within the visualization.

The files system also comprises a resource management system configured to merge resources from an external ZIG into a container ZIG's resources and to automatically scope and rename resource objects to resolve conflicts.

Also included is a scoping mechanism within the data processing system, configured to differentiate between multiple key/values within the same container ZIG by prefixing key names with a scope name, thereby maintaining uniqueness of the key/values; and a manufacturing data system separate from the rendering engine, configured to retain manufacturing data based on original specifications for use in various manufacturing facilities or processes.

The files system also comprises a database or storage system for storing references to self-contained ZIGs, wherein the data processing system is further configured to dynamically load said ZIGs as placeholders within the container ZIG based on key/value pairs provided by the transformation system.

The data processing system is further configured to process ZIG files in various formats, including at least one legacy format. The rendering engine uses ray-tracing techniques to enhance the visualizations' photorealistic effect. The transformation system includes a user interface enabling manual adjustment of the position, scale, and rotation of objects within the ZIG files. The resource management system is configured to resolve naming conflicts for resources by appending a unique identifier to the names of the resources from the external ZIG file.

The scoping mechanism is configured to automatically generate scope names based on metadata associated with the container ZIG file. The manufacturing data system includes interfaces for direct communication with various manufacturing equipment, including at least one of the 3D printers, CNC machines, or textile printers. The database or storage system is a cloud-based solution enabling remote access and collaboration among multiple users. The database or storage system includes indexing and search capabilities to retrieve specific ZIG files based on predefined search criteria efficiently.

Described above are the method and apparatus for customizing and visualizing products using a ZIG file system. The process involves receiving a ZIG file with geometry objects and metadata, identifying attribute/value pairs for customization, and incorporating additional ZIG content. A scoping mechanism ensures the distinctiveness of attribute/value pairs when merging ZIG objects. Transformations are applied to the extra content for realistic visualization placement. A rendering engine creates photorealistic visualizations while manufacturing data remains separate for production use. The apparatus includes systems for data processing, rendering, transformation, resource management, scoping, manufacturing data retention, and a database for ZIG file management.

18.0. Animation

A visualization output of the system presented herein has been described so far using still computer images. However, the visualization output may also be defined using, for example, ZIG objects. Using the same ZIG objects and key-value linking may allow the system to produce animations and videos that can be expressed using, for example, common formats such as GIF, MPEG, AVI, MoV, and the like.

An animation is a series of still image frames where contents can change from frame to frame to achieve a variety of effects. For example, applying different values to colors, images, object transformations, lighting, and so on may create the impression of motion.

Animated visualizations may be used to increase a user's interest and present meaningful information about the manufactured product. For example, the effect of a foil process on a card is difficult to communicate without motion, but animating the angle of the card or the scene's lighting demonstrates the shininess associated with foil. Furthermore, animated views of clothing can provide additional information about the fit or the cut of the clothing.

18.1. Flipbooks

A mechanism to embed animation instructions in the ZIG as a resource is called a "flipbook." In the flipbook technique, a series of frames of key-values are generated. Any combination of key-values at each frame may change to create an animated effect.

Requesting a series of rendered frames and accumulating each frame into a video file format may create the animation effect as determined when making the ZIG file and the corresponding flipbook data.

The table below illustrates an example of mapping between the frames and keys:

TABLE 1

| Frame | Key 1 | Key 2 |
|---|---|---|
| 0 | color = green | position = [0,0,0] |
| 1 | color = red | position = [10,0,0] |
| 2 | | position = [20,10,0] |

In this simple example, the table contains three frames and two keys. For the first frame, the color key of an object is set to a green color, and the position is at zero. The second key changes the color to red, moving the position ten units along the x-axis. The third frame leaves the color red (since no new key is specified) and moves the position ten more units along the x-axis and ten along the y-axis.

Rather than supply a set of key-values for each frame, only the frame number is provided as a key-value is used to enable all of the embedded keys at that step. Additional key-values can be provided to supplement or override the embedded flipbook data.

18.2. Arbitrary Animations

An arbitrary animation is an animation that utilizes, for example, an arbitrary set of key-values. Any arbitrary set of key-values can be provided as inputs to generate a sequence of rendered frames in a way where the client specifies the animation effect. Given that a ZIG object element is known to be associated with a transformation key, the values can be generated based on points along a path, periodic functions, look-up tables, or other data sources.

18.3. Real-Time Animations

A real-time animation is one in which the user performs actions or gestures on user interface input devices to interactively manipulate customizations of the custom product. In this paradigm, the user actions are translated into key-values that are provided to the inputs in the ZIG.

Such interactive environments include augmented reality (AR) and virtual reality (VR). Example user input devices include mice, keyboards, pencils, touch, and gestures.

19.0. Client Implementations

Contemporary digital platforms increasingly cater to consumer preferences for personalized digital content, especially in the context of visualizing potential purchases. The market clearly prefers platforms that provide an engaging and immediate experience, allowing users to interact with and visualize products that closely align with their expectations. The current solutions often encounter limitations in responsiveness and fluidity, particularly when adapting visual content to reflect user customizations. These limitations can be attributed to an over-reliance on centralized processing, which becomes an issue in environments with constrained network resources.

The conventional methods for handling customization data and corresponding instructions often prove inadequate, particularly during network instability. This disrupts the user's ability to make and retain changes to product specifications, leading to a subpar user experience. The industry needs a solution that enhances the local handling of data and improves the responsiveness of applications, regardless of network conditions. The present invention offers such a solution, facilitating the efficient and accurate representation of updated visual content. This improves user interaction with the platform and enhances performance across diverse network situations, thereby increasing commercial viability.

19.1. Technical Problem-Technical Solution

Customization of products through digital interfaces has become increasingly prevalent, allowing users to tailor products to their specific preferences. However, existing systems cannot often provide real-time visual feedback as users adjust various product attributes. This limitation can hinder the user's ability to make informed decisions about the customization of the product. Furthermore, traditional systems may rely heavily on server-side processing, leading to latency issues, particularly in low-bandwidth environments. They can disrupt the user experience during the customization process.

Current solutions for managing product and manufacturing instructions typically involve static data containers that do not allow dynamic interaction or visualization. These systems often require constant communication with a central server, which can be problematic in slow or unreliable network connectivity. Additionally, the inability to locally store and process product customization data can result in data loss or delays, further detracting from the user experience and efficiency of the customization process.

The present system addresses these issues by introducing a method and apparatus for generating content of customizable products and managing product+manufacturing instructions. The system utilizes functional data containers that update and edit product+manufacturing instructions in response to external inputs, such as value pairs. These containers facilitate the generation of images that visually represent the stages of product customization. The images are displayed in real-time on a user interface, providing immediate visual feedback as the product is customized. This approach enhances the user's decision-making process and engagement with the product.

In addition to the web-based service, the system incorporates a client-side aspect where the functional data container is stored on the user's device. This allows for the local editing and updating of product+manufacturing instructions without needing a direct connection to a web service. The final product+manufacturing instructions can be pushed from the user's device to initiate a manufacturing event at a chosen time. This distributed system improves portability and performance, mitigates the adverse effects of slow or disrupted network connectivity, and ensures data integrity. The system's optimization for speed and rendering of product+manufacturing instructions also realizes efficiencies in processing and rendering imagery for dynamically updated products.

19.2. Technical Effects

Examples of technical effects achievable using the presented approach include:

1. Real-time generation of static and animated images: The method allows for the generation of static and animated images representing stages of product customization. This lets users visualize the customization process in real time, providing immediate feedback and enhancing the user experience.

2. Dynamic updating of product and manufacturing instructions: The method allows for the updating of product and manufacturing instructions stored within a functional data container in response to external inputs. This dynamic updating ensures the instructions accurately reflect the user's customization choices.

3. Efficient storage and management of data: The method involves storing the functional data container and a set of product options on the user's device. This local storage eliminates the need for constant communication with a server and allows for editing and updating instructions without requiring a direct connection to the web service. It also ensures data security and mitigates the risk of data loss or delays.

4. Optimization of portability and performance: The method utilizes a distributed system comprising the web service or user interface and the user's device to optimize the portability and performance of the functional data container.

This optimization mitigates adverse performance effects due to slow or disrupted network connectivity, ensuring a stable user experience.

5. Enhanced user interaction and decision-making: The method supports interactive elements in the user interface, allowing users to visualize changes to the product in real time during the customization process. This enhances user engagement and facilitates informed decision-making.

6. Streamlined manufacturing event initiation: The method enables users to push their device's final product and manufacturing instructions to initiate a manufacturing event at their chosen time. This streamlines the manufacturing process and provides flexibility to the user.

Overall, the method provides technical effects that improve the responsiveness, efficiency, and user experience in generating static and animated content of customizable products and managing product+manufacturing instructions.

By configuring a functional data container to store resources and product+manufacturing instructions associated with customizable products, the apparatus enables efficient management and retrieval of data necessary for real-time visualization and customization. This storage solution facilitates quick access to the required data, reducing the time needed to generate and display static and animated images that reflect user customizations.

The processor's ability to receive external inputs and update product+manufacturing instructions based on these inputs allows for a responsive and interactive customization experience. As the processor triggers the generation of static and animated images, users can see the immediate impact of their choices on the product, which aids in decision-making and enhances user satisfaction.

The memory's role in storing the generated static and animated images and the functional data container ensures that all relevant data for the customization process is readily available on the client-side device. This local storage capability provides resilience against data loss and maintains the integrity of the customization process, even when the device is offline or experiencing network disruptions.

With a display configured to present visualizations in real time, the apparatus provides a dynamic and engaging user interface that visually communicates changes to the product as they are made. This real-time feedback is crucial for users to understand the implications of their customization choices and fosters a more intuitive interaction with the product.

The communication interface's dual role in receiving user inputs and transmitting updated instructions to a manufacturing facility underscores the apparatus's capability to streamline the customization-to-manufacturing pipeline. This ensures a seamless and efficient transition from digital customization to physical or digital production.

The apparatus's design to operate in a client-side context, allowing local editing and updating of product and manufacturing instructions, empowers users to customize products independently of server availability. This feature enhances the flexibility and convenience of the customization process, as users can make changes at their own pace and according to their preferences.

Optimizing the speed and rendering of product+manufacturing instructions through the apparatus's configuration addresses the challenges of slow or disrupted network connectivity. This optimization ensures a smooth and continuous user experience by minimizing delays and maintaining the visual quality of the product representation.

Employing encryption based on the Advanced Encryption Standard (AES) for storing the functional data container and product options on the user's device provides a robust security measure to protect sensitive data. This encryption safeguards user data from unauthorized access and maintains the confidentiality of the customization process.

The apparatus uses data compression techniques, including lossless compression, to enhance the efficiency of data transmission and storage without sacrificing image quality. This results in faster loading times and reduced bandwidth usage, particularly beneficial in environments with limited network resources.

19.3. Example Embodiments

In some embodiments, users may interact with a web-based application on a personal computer to customize furniture. The application receives user inputs such as color choices and material selections through a graphical user interface (GUI) featuring interactive sliders and color pickers. The system updates the product and manufacturing instructions within a functional data container as the user selects different options. An algorithm processes these inputs to generate a real-time animation displayed on the user's screen, showing how the furniture will look with the chosen customizations. The data container, including the product options, is stored locally on the user's device, allowing offline editing and updating. Once the user is satisfied with the design, they can push the final instructions to a manufacturing facility via a secure network connection.

In some embodiments, the system is implemented on a mobile device, such as a smartphone or tablet, where the user interface is optimized for touch interaction. Users can customize wearable items like watches or shoes by selecting sizes, colors, and additional features. The mobile device's processor updates the product and manufacturing instructions in response to touch gestures, and the animation is displayed on the device's high-definition touchscreen display. The functional data container is encrypted and stored on the device, ensuring data security and allowing users to make changes on the go, even without an internet connection. The final design can be sent to the manufacturer using a secure connection when the device is online.

Another embodiment might involve an augmented reality (AR) application allowing users to visualize customized products in their environment. Users can wear AR glasses or use their mobile devices to project a 3D model of the product, such as a bicycle, into their physical or digital space. They can customize the product using voice commands or AR gestures, and the system updates the product and manufacturing instructions accordingly. The real-time visualizations overlap the user's view, providing an immersive customization experience. The functional data container is stored locally on the AR device, and the final instructions can be transmitted securely to the manufacturer once the user completes the customization.

In some embodiments, the system could be integrated into a retail kiosk where customers can customize and order products on-site. The kiosk includes a large interactive display and various input devices like a keyboard, mouse, or touchpad. Customers can customize products like apparel or accessories using the kiosk's interface, with the system updating the product and manufacturing instructions in real time. The kiosk's processor and memory handle the data container and product options, allowing customers to see their customizations come to life on the screen. After finalizing their choices, customers can order directly through the kiosk, which securely transmits the instructions to the manufacturer.

Each of these embodiments demonstrates the invention's adaptability to various devices and contexts, providing users with a seamless and interactive product customization experience while ensuring data security and the ability to operate with or without continuous network connectivity.

19.4. Client Implementation Summary

In some embodiments, a method for generating static and animated content of customizable products and managing product+manufacturing instructions comprises receiving external inputs in the form of key+value pairs by a web service or user interface. The method further comprises updating product+manufacturing instructions stored within a functional data container in response to the received external inputs; and triggering stored resources within the functional data container to generate a plurality of image frames representing stages of customization of the product by the web service or user interface.

The method also comprises displaying the images, or plurality of image frames as an animation, on a user interface in real-time to visualize the customization of the product; and storing the functional data container and a set of product options as key+value pairs on a user's device.

The method further comprises editing and updating the product+manufacturing instructions locally on the user's device without requiring direct connection to the web service; and pushing the final product+manufacturing instructions from the user's device to initiate a manufacturing event.

The method also comprises optimizing the portability and performance of the functional data container by a distributed system comprising the web service or user interface and the user's device to mitigate adverse performance effects due to slow or disrupted network connectivity and to enhance the speed and rendering of the product+manufacturing instructions.

The external inputs are selected from a group of user selections from a graphical user interface, sensor data, and inputs from an application programming interface (API).

Usually, updating the product+manufacturing instructions includes applying an algorithm that modifies the instructions based on the received external inputs.

An event-driven trigger initiated by a user action triggers the stored resources to generate the plurality of image frames.

The user interface is configured to support interactive elements that allow the user to visualize changes to the product in real time during the customization process. The functional data container and the set of product options are stored in an encrypted format on the user's device to ensure data security.

The user can edit and update the product and manufacturing instructions on their device, and this includes a preview feature that displays the customized product prior to finalizing the instructions. Pushing the final product+manufacturing instructions from the user's device to initiate a manufacturing event is performed via a secure network connection.

The distributed system optimizes the portability and performance of the functional data container by employing data compression techniques to enhance the speed and rendering of the product and manufacturing instructions.

In some embodiments, an apparatus for generating animated content of customizable products and managing product+manufacturing instructions comprises a functional data container configured to store resources and product+manufacturing instructions associated with customizable products.

The apparatus also comprises a processor configured to receive external inputs in the form of key+value pairs, update the product+manufacturing instructions based on the received external inputs, trigger the stored resources to generate image frames for an animation representing the customizable products.

The apparatus further comprises a memory configured to store the generated image frames; a display configured to present the animation of the customizable products in real-time as the product+manufacturing instructions are updated; and a communication interface configured to receive user inputs for customizing the products, transmit the updated product+manufacturing instructions to a manufacturing facility.

The apparatus is further configured to operate in a client-side context by storing the functional data container and product options locally on a user's device, allowing the user to edit and update the product+manufacturing instructions locally without requiring direct connection to a server, and to push the final product+manufacturing instructions from the client-side device to initiate a manufacturing event at a time of the user's choosing. The apparatus is configured to optimize the speed and rendering of the product+manufacturing instructions to realize efficiencies in processing and rendering of imagery for the dynamically updated product, and to mitigate adverse performance effects of slow or disrupted network connectivity, ensuring no loss of data and stability of user experience.

The web service or user interface is a graphical user interface configured to display a three-dimensional model of the customizable product.

The event-driven trigger is initiated by a user action selected from the group consisting of clicking, dragging, and selecting options within the graphical user interface.

The graphical user interface includes interactive sliders and color pickers that allow the user to adjust the visual attributes of the customizable product.

Updating the product and manufacturing instructions is performed using an algorithm that applies parametric design principles based on the received external inputs.

The functional data container and the set of product options are stored on the user's device using encryption based on the Advanced Encryption Standard (AES).

The user interface provides a preview feature that renders a real-time simulation of the customizable product as the product and manufacturing instructions are updated.

Pushing the final product and manufacturing instructions from the user's device is performed using a secure network connection that employs the Transport Layer Security (TLS) protocol.

The distributed system employs data compression techniques, including lossless compression, to enhance the speed and rendering of the product and manufacturing instructions without compromising image quality.

20.0. Implementations Mechanisms

Although the flow diagrams of the present application depict a particular set of steps in a specific order, other implementations may use fewer or more steps in the same or different order than those depicted in the figures.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and program logic to implement the techniques.

Figure 9:
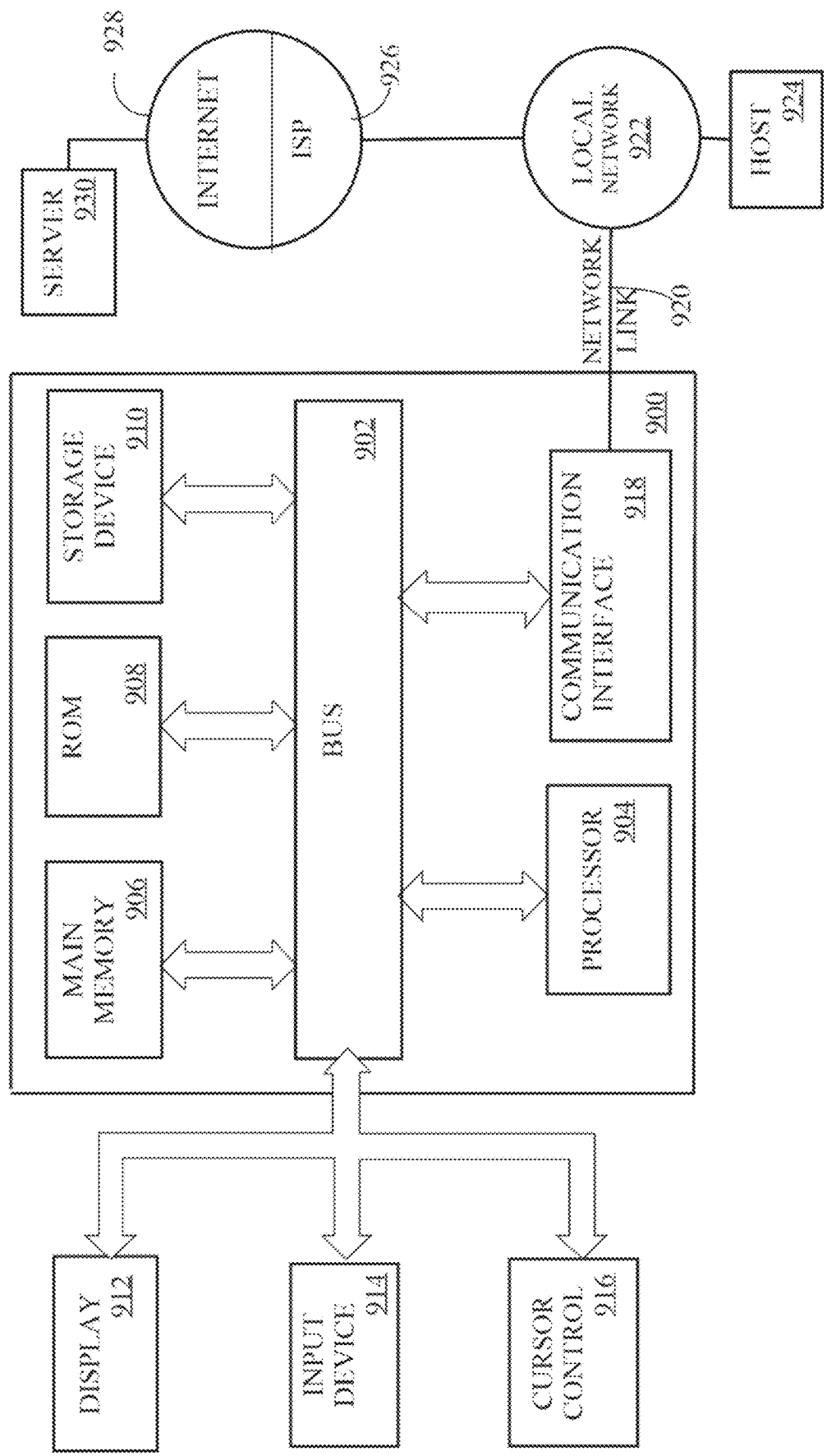
FIG. 9 is a block diagram that illustrates a computer system with which the techniques herein may be implemented.

FIG. 9 is a block diagram that depicts an example computer system 900 upon which embodiments may be implemented. Computer system 900 includes a bus 902 or other communication mechanism for communicating information and a processor 904 coupled with bus 902 for processing information. Computer system 900 also includes a main memory 906, such as a random-access memory (RAM) or other dynamic storage device, coupled to bus 902 for storing information and instructions to be executed by processor 904. Main memory 906 may also be used to store temporary variables or other intermediate information during the execution of instructions to be executed by processor 904. Computer system 900 includes a read only memory (ROM) 908 or other static storage device coupled to bus 902 for storing static information and instructions for processor 904. A storage device 910, such as a magnetic or optical disk, is provided and coupled to bus 902 to store information and instructions.

Computer system 900 may be coupled via bus 902 to a display 912, such as a cathode ray tube (CRT), for displaying information to a computer user. Although bus 902 is illustrated as a single bus, bus 902 may comprise one or more buses. For example, bus 902 may include without limitation a control bus by which processor 904 controls other devices within computer system 900, an address bus by which processor 904 specifies memory locations of instructions for execution or any other type of bus for transferring data or signals between components of computer system 900.

An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and program logic or computer software which, in combination with the computer system, causes or programs computer system 900 to be a special-purpose machine. According to one embodiment, those techniques are performed by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" refers to any medium that provides data that causes a computer to operate in a specific manner. In an embodiment implemented using computer system 900, various computer-readable media are involved, for example, in providing instructions to processor 904 for execution. Such a medium may take many forms, including, but not limited to, non-volatile media and volatile media. Non-volatile media includes, for example, optical or magnetic disks, such as storage device 910. Volatile media includes dynamic memory, such as main memory 906. Typical forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip, or memory cartridge, or any other medium from which a computer can read. Various forms of computer-readable media may be involved in carrying one or more sequences of one or more instructions to processor 904 for execution. For example, the instructions may initially be carried on a magnetic disk of a remote computer. The remote computer can load the instructions into its dynamic memory and send them over a telephone line using a modem. A modem local to computer system 900 can receive the data on the telephone line and use an infrared transmitter to convert the data to an infrared signal. An infra-red detector can receive the data in the infra-red signal, and appropriate circuitry can place the data on bus 902. Bus 902 carries the data to main memory 906, from which processor 904 retrieves and executes the instructions. The instructions received by main memory 906 may optionally be stored on storage device 910 before or after execution by processor 904.

Computer system 900 also includes a communication interface 918 coupled to bus 902. Communication interface 918 provides a two-way data communication coupling to a network link 920 connected to a local network 922. For example, communication interface 918 may be an integrated service digital network (ISDN) card or a modem to connect data to a corresponding telephone line. Another example is Communication Interface 918, a local area network (LAN) card that provides a data communication connection to a compatible LAN. Wireless links may also be implemented. In any such implementation, communication interface 918 sends and receives electrical, electromagnetic, or optical signals that carry digital data streams representing various types of information.

Network link 920 typically provides data communication to other data devices through one or more networks. For example, network link 920 may connect through local network 922 to a host computer 924 or data equipment operated by an Internet Service Provider (ISP) 926. ISP 926 provides data communication services through the world-wide packet data communication network, now called the "Internet" 928. Local network 922 and Internet 928 both use electrical, electromagnetic, or optical signals that carry digital data streams.

Computer system 900 can send messages and receive data, including program code, through the network(s), network link 920, and communication interface 918. In the Internet example, server 930 might transmit a requested code for an application program through Internet 928, ISP 926, local network 922, and communication interface 918. The received code may be executed by processor 904 as it is received and stored in storage device 910 or other non-volatile storage for later execution.

In the foregoing specification, embodiments have been described with reference to numerous specific details that may vary from implementation to implementation. Thus, the sole and exclusive indicator of what is, and is intended by the applicants to be, the approach is the set of claims issued from this application in the specific form in which such claims are issued, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A computer-implemented method for generating and using functional data containers for designing, visualizing, and manufacturing a customizable product, the computer-implemented method comprising:
    initiating, by a computer system, an application for generating functional data containers (ZIGs) and causing reading a list of resources that includes ZIGs and images; wherein the reading includes reading each set of product+manufacturing instructions from a set of product+manufacturing instructions;
    generating by the computer system, using product definition information from each of the sets of product+manufacturing instructions, a proxy representation, of proxies, of each set that defines a transformation translation mechanism;
    combining, by the computer system, the proxies and images into a file and saving the file;
    in response to determining that the file is used by a user, opening the file to allow editing the proxies, and saving the file with a set of product+manufacturing instructions once the editing the proxies is complete;
    in response to determining that the file is used by another software application, opening the file in the another software application to allow editing the proxies, and saving the file with the set of product+manufacturing instructions once editing the proxies is complete; wherein the another software application uses transform tools available in the another software application to transform proxy objects;
    reading, by the computer system, the file with the product+manufacturing instruction files used to generate the proxies;
    encapsulating the images and product+manufacturing instruction sets in a new file; and saving the new file;
    wherein the new file contains image data and product+manufacturing instructions for all specified products;
    receiving a container ZIG file comprising at least one geometry object and associated metadata;
    identifying key-value pairs associated with the container ZIG file for customization of the at least one geometry object;
    embedding or referencing additional ZIG content into the container ZIG file by:
    for embedding, inserting contents of an external ZIG file into the hierarchy of the container ZIG file, wherein the contents comprise a combination of geometry objects, and merging any resources from the external ZIG file into the container ZIG file's resources with automatic scoping and renaming to resolve conflicts;
    for referencing, creating a placeholder geometry within the container ZIG file, referred to as a symbol, that references another self-contained ZIG file, wherein the symbol provides a key for scoping, layer information, and default transformation for placement and scale;
    applying a scoping mechanism to the key-value pairs to maintain uniqueness of the key-value pairs when combining multiple ZIG objects within the container ZIG file, wherein the scoping mechanism prefixes a scope name to a key name separated by a colon;
    transforming the additional ZIG content within the container ZIG file based on the scoped key-value pairs to adjust position, scale, and rotation for realistic placement within a visualization;
    generating a visualization of the container ZIG file with the embedded or referenced additional ZIG content using a rendering engine configured to match lighting and shadows for a photorealistic effect; and
    retaining separate manufacturing data based on original specifications of the geometry objects for manufacturing purposes, wherein the manufacturing data are distinct from the visualization data.

2. The method of claim 1, wherein the transformation translation mechanism is encapsulated in a specified file format, including an Adobe's Photoshop PSD file format;
    wherein the transformation translation mechanism comprises scaling data included in each of the product+manufacturing instructions or additional imagery to automatically transform imagery and proxies to match a specific scale;
    wherein the translation further comprising saving the file containing the proxies and images; wherein each proxy may include one or more objects to represent each product+manufacturing instruction set that may be manipulated as a single object.

3. The method of claim 2, wherein each proxy is placed as a discrete layer within a file format that defines its Z-axis relationship with other proxies in the file;
    wherein, in response to determining that the file is used by a user, opening, by the computer system, an Adobe's Photoshop application allowing each proxy to appear as a "Layer;"
    wherein each layer it to be moved within a software interface to affect an order in which the proxies are stacked in a Z-axis; wherein the computer system provides the transform tools to transform the proxy objects; wherein the transform tools allow positioning, scaling, and rotating
    wherein a defined layout is used to automatically place and transform each proxy within a context of imagery included in the file or in relation to other proxies.

4. The method of claim 1, wherein the product+manufacturing instructions include specifications for embellishments, color options, and materials for a customizable product.

5. The method of claim 1, further comprising generating a digital representation of a customizable product to facilitate comparison with a synthetic rendering of the customizable product.

6. The method of claim 1, wherein the associated metadata includes at least one of image data, color profiles, material properties, or text annotations.

7. The method of claim 1, further comprising: automatically identifying and associating key-value pairs with specific geometry objects based on predefined rules or attributes of the geometry objects;
    maintaining separate manufacturing data in a version-controlled repository, wherein the manufacturing data are synchronized with updates to the visualization data.

8. The method of claim 1, wherein the embedding process includes resolving naming conflicts for resources by appending a unique identifier to the names of the resources from the external ZIG file;
   wherein the placeholder geometry for referencing additional ZIG content is created based on user-defined layer information and default transformation parameters for placement and scale;
   wherein the scoping mechanism prefixes a scope name to a key name, the scope name being derived from a unique identifier associated with the container ZIG file.

9. The method of claim 1, wherein transforming the additional ZIG content includes applying a transformation matrix to the geometry objects based on the scoped key-value pairs.

10. The method of claim 1, wherein the rendering engine is further configured to utilize ray tracing or global illumination techniques to enhance the photorealistic effect of the visualization.

11. An apparatus for generating and using functional data containers for designing, visualizing, and manufacturing a customizable product, the apparatus comprising:
   a computer system configured to serialize and deserialize proprietary C++ objects within functional data container (ZIG) files, wherein said ZIG files contain a hierarchy of objects with associated key/value pairs and resources for product customization;
   wherein the computer system is further configured to execute computer instructions for:
   initiating an application for generating ZIG files and causing reading a list of resources that includes ZIG files and images; wherein the reading includes reading each set of product+manufacturing instructions from a set of product+manufacturing instructions;
   generating, using product definition information from each of the sets of product+manufacturing instructions, a proxy representation, of proxies, of each set that defines a transformation translation mechanism;
   combining the proxies and images into a file and saving the file;
   in response to determining that the file is used by a user, opening the file to allow editing the proxies, and saving the file with a set of product+manufacturing instructions once the editing the proxies is complete;
   in response to determining that the file is used by another software application, opening the file in the another software application to allow editing the proxies, and saving the file with the set of product+manufacturing instructions once editing the proxies is complete;
   wherein the another software application uses transform tools available in the another software application to transform proxy objects;
   reading the file with the product+manufacturing instruction files used to generate the proxies;
   encapsulating the images and product+manufacturing instruction sets in a new file; and saving the new file;
   wherein the new file contains image data and product+manufacturing instructions for all specified products;
   a data processing system configured to manage ZIG files containing geometry objects and associated metadata, and to apply customization to said objects using key-value pairs;
   a rendering engine operatively connected to the data processing system, configured to generate visualizations of the ZIG files and to match lighting and shadows for a photorealistic effect;
   a transformation system coupled to the rendering engine, configured to apply transformations to objects within the ZIG files based on key-value pairs to adjust position, scale, and rotation for realistic placement within the visualization;
   a resource management system configured to merge resources from an external ZIG into a container ZIG's resources and to automatically scope and rename resource objects to resolve conflicts;
   a scoping mechanism within the data processing system, configured to differentiate between multiple key-values within the same container ZIG by prefixing key names with a scope name, thereby maintaining uniqueness of the key-values;
   a manufacturing data system separate from the rendering engine, configured to retain manufacturing data based on original specifications for use in various manufacturing facilities or processes; and
   a database or storage system for storing references to self-contained ZIGs, wherein the data processing system is further configured to dynamically load said ZIGs as placeholders within the container ZIG based on key-value pairs provided by the transformation system.

* * * * *